(12) United States Patent
Croxford et al.

(10) Patent No.: US 10,825,128 B2
(45) Date of Patent: Nov. 3, 2020

(54) DATA PROCESSING SYSTEMS

(71) Applicant: ARM Limited, Cambridge (GB)

(72) Inventors: Daren Croxford, Cambridge (GB); Ben James, Cambridge (GB); Sean Ellis, Cambridge (GB); Edward Charles Plowman, Cambridge (GB)

(73) Assignee: Arm Limited, Cambridge (GB)

( * ) Notice: Subject to any disclaimer, the term of this patent is extended or adjusted under 35 U.S.C. 154(b) by 354 days.

(21) Appl. No.: 14/822,605

(22) Filed: Aug. 10, 2015

(65) Prior Publication Data

US 2016/0042491 A1    Feb. 11, 2016

(30) Foreign Application Priority Data

Aug. 11, 2014   (GB) .................................. 1414204.6

(51) Int. Cl.
  *G06T 1/60*   (2006.01)
  *G06T 11/40*  (2006.01)
  *G09G 5/36*   (2006.01)

(52) U.S. Cl.
  CPC ............. *G06T 1/60* (2013.01); *G06T 11/40* (2013.01); *G09G 5/363* (2013.01); *G09G 2340/02* (2013.01); *G09G 2360/08* (2013.01); *G09G 2360/122* (2013.01)

(58) Field of Classification Search
  CPC ...................... G09G 2340/02; G09G 2360/122
  See application file for complete search history.

(56) References Cited

U.S. PATENT DOCUMENTS 5,293,481 A  *  3/1994  Mita ......................... G06T 1/20
                                                  345/505
6,115,496 A     9/2000  Nguyen
8,553,997 B1 * 10/2013  Hernandez Esteban ....................
                                                  G06T 9/001
                                                  382/154

(Continued)

FOREIGN PATENT DOCUMENTS

WO          0169936 A2    9/2001
WO          WO02/31806    4/2002

(Continued)

OTHER PUBLICATIONS

GB Search Report dated Feb. 12, 2016, GB Patent Application No. GB1514125.2.

(Continued)

*Primary Examiner* — Ming Wu
(74) *Attorney, Agent, or Firm* — Vierra Magen Marcus LLP

(57) ABSTRACT

A data processing system comprises processing circuitry arranged to generate data to form an output array of data, processing circuitry arranged to store the generated data in an output buffer 15 by writing compressed blocks of data representing particular regions of the output array of data to the output buffer, processing circuitry 14 arranged to read a compressed block of data representing a particular region of the array of data from the output buffer, processing circuitry 16 arranged to acquire meta-data from the compressed block of data, and processing circuitry 21 arranged to process the block of data. The acquired meta-data is used to affect the processing of the block of data.

18 Claims, 9 Drawing Sheets

(56) References Cited

U.S. PATENT DOCUMENTS

| | | | | |
|---|---|---|---|---|
| 2002/0158893 | A1* | 10/2002 | MacInnis | H04N 21/42653 345/698 |
| 2004/0099741 | A1* | 5/2004 | Dorai | G06K 7/14 235/462.08 |
| 2005/0057670 | A1* | 3/2005 | Tull | G06T 1/0007 348/241 |
| 2006/0291425 | A1* | 12/2006 | Park | H04W 36/0011 370/331 |
| 2006/0294125 | A1* | 12/2006 | Deaven | H04N 19/46 |
| 2009/0087110 | A1 | 4/2009 | Tourapis | |
| 2013/0251256 | A1 | 9/2013 | Deng | |
| 2014/0184601 | A1* | 7/2014 | Dunaisky | G09G 5/393 345/424 |

FOREIGN PATENT DOCUMENTS

| | | |
|---|---|---|
| WO | 2007037726 A1 | 4/2007 |
| WO | 2008092076 A2 | 7/2008 |
| WO | 2012035533 A2 | 3/2012 |

OTHER PUBLICATIONS

GB Search and Examination Report dated Jun. 28, 2018, GB Patent Application No. GB1514125.2.

SMPTE 327M-2000, "Proposed SMPTE Standard for Television-Transporting MPEG-2 Recoding Information Through High-Definition Digital Interfaces", Available from: http://car.france3.mars.free.fr/HD/INA-%2026%20jan%2006/SMPTE%20normes%20et%20confs/s351m.pdf [accessed Jun. 26, 2018].

GB Search Report dated Feb. 25, 2015, GB Patent Application No. GB1414204.6.

"Proceedings of the Academy of Information and Management Sciences," Allied Academies International Conference, Jacksonville, Florida, Apr. 11-14, 2007, vol. 11, No. 1.

Rao, et al., "A Survey of Video Enhancement Techniques," Journal of Information Hiding and Multimedia Signal Processing, vol. 3, No. 1, Jan. 2012.

Arman, et al., "Image Processing on Compressed Data for Large Video Databases," Proceedings of First ACM International Conference on Multimedia, Aug. 2-6, 1993, Anaheim, CA.

Roman-Gonzalez, et al., "Image Processing by Compression: An Overview," Proceedings of the World Congress on Engineering and Computer Science 2012, vol. I, WCECS 2012, Oct. 24-26, 2012, San Francisco, USA.

"Digital Image Interpolation," http://www.cambridgeincolour.com/tutorials/image-interpolation.htm, printed Aug. 18, 2015.

* cited by examiner

DATA PROCESSING SYSTEMS

BACKGROUND

The technology described herein relates to data processing systems, and in particular to the processing of compressed data in graphics processing systems.

As is known in the art, following the rendering and rasterising of a frame in a graphics processing system, the frame is typically compressed to reduce the memory bandwidth and is written to a frame buffer. The compressed frame is then decompressed and read by a display controller or image processor where further image processing is performed, e.g. image scaling, manipulation and/or enhancement, with the results being sent straight to the display (the output image is not written back to memory or the frame buffer). As a result this image processing has to be performed in a single pass at the frame refresh rate, which is typically 60 frames per second.

As a typical tablet currently has a display resolution of 2048×1536 pixels, and assuming a data size of 32 bits per pixel, this results in having to process 720 MB of data per second. Display resolutions are expected to continue to increase for mobile devices, with 4K (3840×2160 pixels) tablets expected in 2015, and image processing being performed in such mobile devices is expected to become increasingly complex and therefore more computationally intensive, in order to provide improved image quality over a range of conditions.

The Applicants believe that there remains scope for improvements to the processing of data (e.g. in images between the frame buffer and the display), in data processing systems.

BRIEF DESCRIPTION OF THE DRAWINGS

A number of embodiments of the technology described herein will now be described by way of example only and with reference to the accompanying drawings, in which.

DETAILED DESCRIPTION

Figure 1:
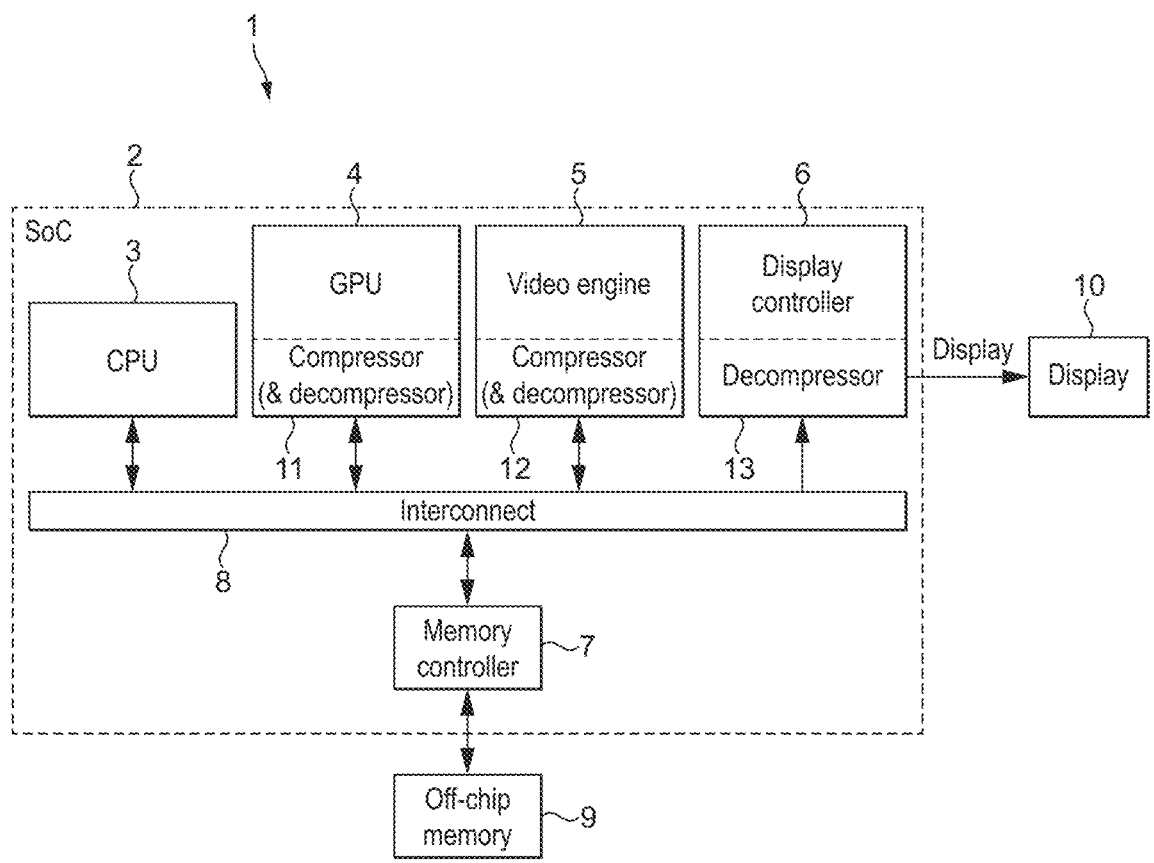
FIG. 1 shows schematically an exemplary data processing system that can operate in accordance with the described embodiments of the technology described herein.

A first embodiment of the technology described herein comprises a method comprising:

storing data in an output buffer by writing compressed blocks of data representing particular regions of an output array of data to the output buffer;

reading a compressed block of data representing a particular region of the output array of data from the output buffer;

acquiring meta-data from the compressed block of data; and processing the block of data;

wherein the meta-data is used to affect the processing of the block of data.

A second embodiment of the technology described herein comprises a data processing system comprising:

processing circuitry arranged to generate data to form an output array of data;

processing circuitry arranged to store the generated data in an output buffer by writing compressed blocks of data representing particular regions of the output array of data to the output buffer;

processing circuitry arranged to read a compressed block of data representing a particular region of the array of data from the output buffer;

processing circuitry arranged to acquire meta-data from the compressed block of data; and processing circuitry arranged to process the block of data;

wherein the meta-data is used to affect the processing of the block of data.

The technology described herein relates to and is implemented in a data processing system, e.g. for processing an output array of data, and a method, e.g. of operating a data processing system in which data generated by the data processing system is used to form an output array of data in an output buffer, in which an output array of data (which could be, e.g., and in one embodiment is, a frame to be displayed) is stored in an output buffer (which could be, e.g., and in one embodiment is, the frame buffer) by writing blocks of data that represent particular regions of the output array of data to the output buffer. Each block of data represents a particular region of the output array of data and thus in an embodiment each block of data represents a rendered tile generated by the data processing system, e.g. together forming a frame to be displayed.

The blocks of data forming the output array of data which is written to the output buffer are subsequently read from the output buffer and processed, e.g. by a display controller prior to display.

The blocks of data are stored in a compressed form in the output buffer. Thus in an embodiment the method comprises the step of compressing the blocks of data, and writing the compressed blocks of data to the output buffer.

In an embodiment the blocks of data are compressed individually, i.e. block by block, such that each compressed block of data is a compressed representation of the respective block of data that it relates to (owing to the fact that in an embodiment the tiles are rendered and written out to the output buffer separately). Thus in an embodiment each compressed block of data is a compressed representation of a particular rendered tile.

When data, e.g. images, are compressed, meta-data is often created as part of the compression process or the data is compressed in such a way that meta-data may be extracted from the compressed data. At least some of the meta-data may contain information which is representative of characteristics of the original data before it was compressed. The meta-data therefore may contain information which either is no longer present in the compressed data, e.g. owing to lossy compression, and/or which can be used to process the data more efficiently, e.g. because the data would otherwise have to be analysed further to obtain this information.

Therefore, by using meta-data during subsequent processing of the blocks of data to affect the processing of the blocks of data, the amount of image processing required and thus power consumed is reduced, or alternatively a more complex level of processing can be performed for the same amount of power. Furthermore the technology described herein reduces the amount of data needed to be transferred because the meta-data can be used to infer information about the original blocks of data, i.e. before they were compressed, therefore obviating the need to use the original blocks of data and thus being able to use the compressed blocks of data.

The meta-data can be acquired from the compressed blocks of data in any desired and suitable way. This may depend on the way in which the blocks of data are compressed, i.e. upon the compression scheme. In some compression schemes meta-data is generated, e.g. automatically, during compression of the data, and may, for example, form part of the compressed data, thus allowing the meta-data simply to be read along with the block of data. In other compression schemes the meta-data may need to be determined, e.g. generated or calculated, from the compressed data, in which case the method may comprise a further step of processing the compressed block of data to acquire the meta-data. In either circumstance, only the meta-data needed for affecting the subsequent processing of the block of data may be acquired, e.g. by reading or determining only the meta-data necessary for the subsequent processing.

The processing of the block of data could take place on the compressed block of data, i.e. without the data first being decompressed. For example, the combination of the meta-data and the compressed block of data may be sufficient for it not to be necessary for the data to be decompressed, as will be discussed in more detail below. However in one embodiment the compressed block of data is decompressed and the decompressed block of data is processed, with the meta-data being used to affect the processing of the decompressed block of data.

The meta-data can be used in any suitable and desired way to affect the processing of the blocks of data, e.g. anytime compressed image data is fetched or used, as will be discussed below. However in an embodiment the step of processing the block of data comprises performing image modifications, e.g. display modifications, on the block of data, e.g. using any suitable and desired image processing algorithm, wherein the meta-data is used to affect processing of the decompressed block of data. (The blocks of data may not necessarily be sent to a display immediately but rather stored for future display, but may undergo image modifications nonetheless.)

In one embodiment the step of performing image (display) modifications on the block of data comprises scaling the block of data and/or performing image enhancement on the block of data, wherein the meta data is used to affect the scaling of the block of data and/or the image enhancement on the block of data. In an embodiment the image (display) modifications are performed by a display controller or image processor, as will also be discussed below.

Thus the method in an embodiment comprises the step of displaying the processed block of data, i.e. using a display controller. Thus the processing circuitry used to read the compressed block of data could comprise the display controller. Alternatively, a separate component, e.g. an image processor, could be used to read the compressed block of data. The image processor can then process the block of data using the meta-data, and the display controller can display the processed block of data.

The process of scaling involves enlarging or reducing the size of the array of data, e.g. the frame, from the size of the (compressed) array of data to the size of the output array of data, e.g. for display. This process occurs frequently when the size of the display is different to the size of the generated frame.

The process of image enhancement (using the meta-data) involves modifying image data, e.g. that has been output into a frame buffer, so as to optimise the image for display. This will typically involve modifying, e.g. increasing, the contrast of the image or modifying the brightness of the image. Image enhancement typically involves applying a transformation function to the original frame buffer data so as to remap the luminance of the pixels or sub-pixels with respect to a high and low threshold value. Techniques used for image enhancement, e.g. modifying the contrast, include contrast enhancement, histogram equalisation and histogram stretching. For convenience the term image enhancement will be used herein, but it will be understood that this is intended to include and encompass all equivalent terms and techniques.

The process of image enhancement may be performed for a variety of different uses. For example, if the image is to be displayed in dark ambient conditions, e.g. inside a darkened room, the luminance of the image can be increased and the backlight power can be reduced to reduce the overall power consumption of the display. If the image is to be displayed, for example, in bright ambient conditions, e.g. outdoors in sunshine, the brightness can be increased, or alternatively tone mapping can be used, to make the image easier to view.

Other image enhancement techniques that can be used (i.e. performing image enhancement using the meta-data) include auto-focussing, auto-white balance and auto-exposure, as well as creative image processing, e.g. making the image appear as if it was taken using a vintage camera.

The process of image enhancement using the meta-data may not result in the immediate display of the image, but can be performed so that the image can be used for further processing, e.g. prior to display. In one embodiment the meta-data is used to detect or extract features from the block of data, e.g. the image. This may be to determine if there are faces in the image, for example, for the purposes of auto-focus, or to detect edges in the image for character recognition or for computer vision.

Yet other image processing techniques include transcoding the block of data to another format, e.g. to convert an image compressed using the ARM Frame Buffer Compression (AFBC) scheme, as described in US-A1-2013/0034309, to MPEG H.264.

The technology described herein could be implemented in any suitable and desired location within the data processing system, e.g. as a part of a graphics processing pipeline, and is suitable for being used whenever compressed image data is being fetched or used, e.g. anytime the GPU performs image processing on compressed image data, and thus the image (display) modifications need not necessarily be performed by an image processor or display controller, but by any suitable component in the system.

However in an embodiment the compressed blocks of data, e.g. the array of data, are held in a frame buffer, from where it may be read out by a display controller for processing and display, or read out by an image processor for processing, i.e. to provide the output frame for display. Thus in an embodiment the method comprises the step of processing the block of data using the display controller or the image processor. This is in an embodiment followed by the step of displaying the block of data using the display controller.

The device displaying the block of data may not necessarily be in the same physical apparatus as that which contains the data processing system and, for example, contains the graphics processing pipeline, the image processor or display processor as applicable. For example, the processed block of data can be sent wirelessly to a display, e.g. using WiDi (Wireless Display) or Miracast, or the processed image can be sent over a network and then displayed.

Thus in an embodiment the method also comprises one or more of the steps of: generating the block of data, e.g. in an embodiment generating the array of data (comprising a plurality of blocks of data), storing the block of data in a output (frame) buffer, e.g. in an embodiment storing the array of data in a frame buffer, and reading the block of data from a frame buffer for processing.

In these embodiments, i.e. in which the array of data is stored in a frame buffer, the array of data (frame to be displayed) can be generated as desired, e.g. by being appropriately rendered and stored into a frame buffer, and by any appropriate component (frame generator) of the overall data processing system. In an embodiment, the frame to be displayed is a frame generated by a graphics processor, a frame generated by a video processor (video engine), or a frame provided by a composition engine (a compositor).

Thus, the frame generation stage in an embodiment comprises a graphics processor, a video processor (video engine), or a composition engine (a compositor). There may be more than one frame generator if desired, and one or more than one (or all) of the frame generators may be operable in the manner of the technology described herein. The frame generation stage may also include other components, such as a compression stage (compression engine), if desired (and in an embodiment this is the case).

The meta-data can be used in a number of different ways to affect the processing of the blocks of data. In one embodiment the meta-data is used to control the processing of the block of data, e.g. by determining which one of a plurality of processes to use to process the block of data. Thus in an embodiment the method comprises the step of choosing, using the meta-data, between one of a plurality of processes to use to process the block of data. As the meta-data contains information which is representative of characteristics of the original data before it was compressed, it can be used, for example, to determine the level of processing needed for the block of data, e.g. for display.

For example, the meta-data may contain information relating to the variation in the data, e.g. the colour, in the block of data, i.e. at different points over the block of data, with different processes being chosen between to be used according to the level of variation of the data, e.g. colour, in the block of data indicated by the meta-data. Thus in an embodiment a first process is used if the data (colour) is the same for all of the block of data, a second process is used if the block of data has a small variation in the data values (colour), and a third process is used if there is a large variation in the data values (colour) across the block of data (e.g. an edge in the colour values).

In a further, not-necessarily mutually exclusive, embodiment, the meta-data is used in the processing of the block of data itself to affect the processing, i.e. the details of the process used for the processing of the block of data depend upon the meta-data as an input to the process, e.g. the meta-data is used as a variable in the processing. In this embodiment adaptive algorithms may be used to process the block of data based on the meta-data.

For example, the meta-data may contain information relating to the variation in the data (e.g. colour) in the block of data, and the variation could be analysed to determine the amount of smoothing to be performed in the block of data and/or the location and intensity of an edge (a sharp change in data values) in the block of data, for example. This use of the meta-data in an adaptive algorithm could be used after choosing a particular process to use, depending on the meta-data, for processing the block of data, as described above.

As has been alluded to above, in an embodiment the meta-data comprises information representative of the variation in the data (e.g. colour) in the block of data. This information is particularly useful when scaling an image and when performing image enhancement, as will now be described. In addition to the meta-data being analysed to determine the variation in data values (colour) in a block of data, the data in the (compressed) block of data itself may be analysed, and the combination of this with the meta-data used to determine the variation in the data values (colour) in the block of data.

If, for example, the meta-data indicates that there is no variation in the data (e.g. colour) in the block of data, i.e. the data (colour) is all the same, then when the block of data is scaled and/or displayed, the same data (colour) can be used for each point, e.g. pixel, across the block of data. Thus in an embodiment the method comprises the step of using the meta-data to determine whether the data (colour) is the same over all of the block of data. In such a circumstance it may not be necessary to decompress the block of data, i.e. if it is known that all the points (pixels) of the block of data have the same data value, it is unnecessary to decompress the block of data to determine the data value (colour) at each point. Furthermore, it may not be necessary to perform scaling over all the points in the block of data as the data value (colour) can simply be repeated across the block to be displayed for however many points (pixels) are in the final display corresponding to the block of data. Thus the amount of processing needed to display or scale the block of data is reduced.

In another example, the meta-data may indicate that there is a large variation in the data values (colour) in the block of data, e.g. an "edge" is present where there is distinct change in data values (colour) between neighbouring points (pixels) in the block of data, i.e. the method comprises the step of using the meta-data to determine whether there is an edge in the block of data. In this circumstance, particularly when scaling the block of data, it is important to process the edge carefully, e.g. using an edge or contrast enhancement algorithm, such that the edge is preserved when the block of data is displayed.

In addition to edges being detected within a block of data, in the embodiments in which there are multiple blocks of data in the array of data (which will be described in more detail below), points (pixels) at the edge of each block of data will be adjacent to points at the edge of adjacent blocks of data. Thus in an embodiment the process of edge detection is performed on the points at the edge of each block of data, e.g. in addition to being performed on the points (pixels) within an individual block of data, so that edges between blocks of data can be detected.

To detect edges between blocks of data, in an embodiment the meta-data for adjacent blocks of data in the array of data is analysed, and an appropriate edge enhancement algorithm is performed on the points at the perimeter of the block of data.

In a further example, the meta-data may indicate that there is only a small variation in the data values (colour) in the block of data, i.e. it is not all the same data value (colour) but there are no edges present. In this circumstance, a smoothing algorithm may be used to process the block of data, e.g. during scaling, with it not being necessary to perform edge detection and enhancement.

Thus it can be seen that the meta-data contains useful information regarding the characteristics of the block of data, and therefore can be used to choose what type of processing the block of data undergoes, e.g. during scaling, image enhancement and/or display. Thus, when needed, more complex processing can be used, e.g. when the meta-data indicates that an edge is present in the block of data, or simpler processing can be used when this is adequate for the type of data indicated to be in the block of data by the meta-data, e.g. when the data values (colour) are all the same in the block of data.

The step of processing the block of data using the meta-data may include the generation of histograms, i.e. from the meta-data, to determine processing information (parameters, e.g. image (display) modification information (parameters)) for the block of data.

As described above, the technology described herein is in an embodiment implemented in a graphics processing system in which a compressed frame to be displayed is written out to a frame buffer and then processed by a display controller prior to display. This will be the case, for example, and as will be appreciated by those skilled in the art, in a tile-based data processing system, in which case each block of data that is processed in the manner of the technology described herein may (and in one embodiment does) correspond to a "tile" that the rendering process of the graphics processor produces (although as will be discussed further below, this is not essential).

(As is known in the art, in tile-based rendering, the two dimensional array of data or frame of the rendering process (the "render target") (e.g., and typically, that will be displayed to display the scene being rendered) is sub-divided or partitioned into a plurality of smaller regions, usually referred to as "tiles", for the rendering process. The tiles (sub-regions) are each rendered separately (typically one after another). The rendered tiles (sub-regions) are then recombined to provide the complete output array (frame) (render target), e.g. for display.

Other terms that are commonly used for "tiling" and "tile based" rendering include "chunking" (the sub-regions are referred to as "chunks") and "bucket" rendering. The terms "tile" and "tiling" will be used herein for convenience, but it should be understood that these terms are intended to encompass all alternative and equivalent terms and techniques.)

The output array of data that the data generated by the data processing system is being used to form may be any suitable and desired such array of data, e.g. that a graphics processor may be used to generate. In one embodiment it comprises an output frame for display, but it may also or instead comprise other outputs of a graphics processor such as a graphics texture (where, e.g., the render "target" is a texture that the graphics processor is being used to generate (e.g. in "render to texture" operation) or other surface to which the output of the data processing system is to be written.

Similarly, the output buffer that the data is to be written to may comprise any suitable such buffer and may be configured in any suitable and desired manner in memory. For example, it may be an on-chip buffer or it may be an external buffer (and, indeed, may be more likely to be an external buffer (memory), as will be discussed below). Similarly, it may be dedicated memory for this purpose or it may be part of a memory that is used for other data as well. As discussed above, in an embodiment the output buffer is a frame buffer for the data processing system and/or for the display that the data processing system's output is to be provided to.

The blocks of data can each represent any suitable and desired region (area) of the overall array of data, including and up to the whole array of data, i.e. there may only be a single block. However in an embodiment the array of data comprises a plurality of blocks of data, i.e. the blocks of data are smaller than the whole array of data. In this embodiment the sub-division of the array of data into blocks of data can be done as desired.

Each generated block of data in an embodiment represents a different part (sub-region) of the overall array (although the blocks could overlap if desired). Each block should represent an appropriate portion (area) of the array of data, such as a plurality of data positions within the array. Suitable data block sizes would be, e.g., 8×8, 16×16 or 32×32 data positions in the output data array.

In one embodiment, the array of data is divided into regularly sized and shaped regions (blocks of data), in an embodiment in the form of squares or rectangles. However, this is not essential and other arrangements could be used if desired.

In one embodiment, each block of data corresponds to a rendered tile that the graphics processor produces as its rendering output. This is a particularly straightforward way of implementing the technology described herein, as the graphics processor will generate the rendering tiles directly, and so there will be no need for any further processing to "produce" the data blocks that will be processed in the manner of the technology described herein.

The blocks of data in the array of data may be compressed, and the meta-data produced, in any suitable and desired way. However a number of schemes that the Applicants envisage could be used will now be described.

In a first couple of examples, certain data encoding schemes, such as the Applicant's Adaptive Scalable Texture Compression (ASTC) scheme as described in GB-A-2491687, or ARM Frame Buffer Compression (AFBC) scheme as described in US-A1-2013/0034309, compress data in such a way that the variation in data values (colour) of the data can be identified from the encoded data itself, i.e. meta-data is directly available from these encoding schemes which indicates characteristics of the original data.

Thus, in an embodiment, the blocks of data are compressed in such a way that the variation in data values (colour) of the compressed blocks of data can be identified from the compressed blocks of data themselves (e.g., and in an embodiment, using one of the Applicant's ASTC or AFBC encoding schemes), and the meta-data is then determined from the compressed block of data.

In the AFBC encoding scheme the blocks of data are compressed such that the smallest data (colour) value is provided for each block of data, along with the differences (deltas) from this value, which can be used to determine the actual data values (colours), e.g. of the pixels in the block. A large delta width (i.e. the range of deltas in a block of data), for example, indicates a large variation of data values (colour) in a block of data, and vice versa. Thus the meta-data comprising the smallest data (colour) value and the delta width can be analysed to determine the range of data values (colours) in the block of data, e.g. to determine whether or not an edge is present in the block of data and thus what type of scaling algorithm should be used on the block of data.

In particular, if the delta width equals zero, this indicates that the data value (colours) is the same across the whole block of data, and the block of data can be (scaled, if necessary, and) displayed simply by replicating the data value (colours) for each data point (pixel).

If the delta width for a block of data is small, i.e. there is little variation in the delta values within the block of data, this indicates that there are no edges in the block of data, so a smoothing algorithm can be used to (scale and) display the block of data.

If the delta width is large, i.e. there is a large variation in the delta values within the block of data, this indicates that there are edges present within the block of data. In this circumstance the individual delta values may be analysed to determine where an edge is located within the block of data. Once this has been done, a contrast/edge enhancement algorithm, for example, can be used on the edge and a smoothing algorithm can be used for the rest of the block of data.

In some compression schemes, e.g. the AFBC scheme, the compression is hierarchical. Therefore depending on the analysis of the meta-data, e.g. if it is for edge-detection or smoothing, greater or fewer levels of the meta-data can be acquired, i.e. because higher levels of the meta-data contain a greater degree of information about the compressed data. The same selective acquisition of the meta-data may also be used depending on the size of the output array of data, e.g. the size of the image required for the display. For example, if an image is being downscaled, only the lower levels of the meta-data may need to be acquired.

Furthermore, if the array of data has been encoded using such a hierarchical compression scheme, the meta-data may be acquired in stages, depending on the analysis of the previous stage of meta-data that was acquired. For example, if the variation in the data (colour) of the block of data is being analysed, the lowest level of meta-data could be acquired first to determine whether there is some variation in the data (colour) of the block of data or the data (colour) is uniform for the whole block of data. If there is some variation, the next level of meta-data may be acquired to determine how much variation in the data values (colour) there is in the block of data, e.g. to use as an input for a smoothing algorithm. A yet further level of meta-data may be acquired to determine the position of any edges within the block of data.

In the ASTC encoding scheme, the blocks of data are compressed such that the data value (colour) endpoints are provided for each block of data. Thus the meta-data comprising the data value (colour) endpoints can be analysed to determine the range of data values (colours) in the block of data, e.g. to determine whether or not an edge is present in the block of data and thus what type of scaling algorithm should be used on the block of data, as has been explained above with reference to the AFBC encoding scheme.

The ASTC encoding scheme also allows "void extent blocks" to be provided, which specify a region over which the data (colour) has a constant value, i.e. such that the data value (colour) at each point (pixel) in a block does not have to be specified. This meta-data can therefore be used in the same manner as for the AFBC scheme when the delta width equals zero, i.e. it indicates that the data value (colour) for these points (pixels) within the block of data can simply be replicated across the necessary region of the display.

In one embodiment one or more of the blocks of data may be compressed using run length encoding, with the meta-data obtained from this compression indicating that a number of points (pixels) within a block of data are all the same data value (colour). This meta-data can therefore be used in the same manner as for the AFBC scheme when the delta width equals zero, i.e. it indicates that the data value (colour) for these points (pixels) within the block of data can simply be replicated across the necessary region of the display.

In one embodiment one or more of the blocks of data may be compressed using a discrete cosine transform, e.g. used for encoding video. This separates out the data (colour) variations into frequency components and associated weights for each component, such that if the weights for the high frequency components (large variations in data values (colour) are small, this indicates that there are no sharp edges in the block of data, and vice versa.

Once each of the blocks of data (e.g. tiles) in the array of data (e.g. frame) that is to be processed has been treated according to the method of the technology described herein, the process of the technology described herein may be repeated for the next array of data (frame) to be processed (displayed) and so on. (As will be appreciated by those skilled in the art, the technology described herein would typically be, and in an embodiment is, implemented for a sequence of frames to be displayed, and in an embodiment for each frame in a sequence of frames to be displayed.)

The technology described herein can be implemented in any desired and suitable data processing system that is operable to generate arrays of data, e.g. frames for display on an electronic display. The system in an embodiment includes a display, which is in an embodiment in the form of an LCD or an OLED display.

In an embodiment the technology described herein is implemented in a data processing system that is a system for displaying windows, e.g. for a graphical user interface, on a display, and in an embodiment a compositing window system.

The data processing system that the technology described herein is implemented in can contain any desired and appropriate and suitable elements and components. Thus it may, and in an embodiment does, contain one or more of, and in an embodiment all of: a CPU, a GPU, a video processor, a display controller, a display, and appropriate memory for storing the various arrays of data (frames) and other data that is required.

The generated array(s) of data (frame(s) to be displayed) and the output array of data (e.g. frame for the display (and any other source surface (frames))) can be stored in any suitable and desired manner in memory. They are in an embodiment stored in appropriate buffers. For example, the output array of data (frame) is in an embodiment stored in an output (frame) buffer.

The output (frame) buffer may be an on-chip buffer or it may be an external buffer (and, indeed, may be more likely to be an external buffer (memory), as will be discussed below). Similarly, the output (frame) buffer may be dedicated memory for this purpose or it may be part of a memory that is used for other data as well. In some embodiments, the output (frame) buffer is a frame buffer for the data processing system that is generating the frame and/or for the display that the frames are to be displayed on.

Similarly, the buffers that the generated arrays of data (frames) are first written to when they are generated (rendered) may comprise any suitable such buffers and may be configured in any suitable and desired manner in memory. For example, they may be an on-chip buffer or buffers or may be an external buffer or buffers. Similarly, they may be dedicated memory for this purpose or may be part of a memory that is used for other data as well. The input (frame) buffers can be, e.g., in any format that an application requires, and may, e.g., be stored in system memory (e.g. in a unified memory architecture), or in graphics memory (e.g. in a non-unified memory architecture).

As discussed above, in the technology described herein, data is stored in an output buffer by writing compressed blocks of data representing particular regions of an output array of data to the output buffer, a compressed block of data representing a particular region of the output array of data is read from the output buffer, meta-data is acquired from the compressed block of data, and the block of data is processed wherein the meta-data is used to affect the processing of the block of data. As discussed above, in one embodiment, the output array of data is a frame to be displayed, the output buffer is a frame buffer, and blocks of data that represent particular regions of the frame are read from the frame buffer and processed by a display controller prior to display.

The Applicants have furthermore recognised that the technology described herein is applicable to and useful in a number of other arrangements.

This is because, in general, when processing relatively large arrays of data it can often be the case that the amounts of "entropy" will vary greatly across the array, i.e. such that the degree or type of processing required for different regions of the array can vary greatly. This can be the case, for example, when processing arrays of data comprising image data (e.g. from a camera), video stream data, texture maps, graphics data and other (intermediate) graphics buffer data.

Typically, such arrays of data are processed using a "brute force" approach, e.g. by applying a function or kernel to groups of data elements of the array (e.g. to 2×2 groups of elements of the array or larger), where the function or kernel is executed in lock step for each element. Where one or more of the data elements in a group of elements requires additional processing (e.g. features divergent behaviour (e.g. loops or branches) in the code), evaluation of these elements can become serialised rapidly, thereby reducing the throughput. Accordingly, such functions or kernels typically have an "execute always" profile, which can lead to redundant calculations being performed, e.g. for those regions of the array where the "entropy" is low.

The "entropy" of such data arrays can also be determined by pre-processing the array, but this comes at the expense of an additional processing pass and therefore additional resources.

As discussed above, the technology described herein can use meta-data acquired from a compressed block of data that represents a particular region of an output array of data to affect the processing of the block of data, e.g. to thereby reduce the amount of processing required, memory bandwidth and power consumed by the data processing system, or to allow a relatively more complex level of processing to be performed for the same amount of processing, bandwidth, and/or power consumption. This can be particularly useful, for example, in data processing systems that have more limited resources, such as mobile or low power data processing systems. Thus, the technology described herein may be useful when processing data arrays in general.

Accordingly, the output array of data of the technology described herein may more generally comprise any suitable and desired output array of data, such as an array of image data (including, but not limited to RGB image data, RGBA image data, sRGBA image data, YUV image data, etc.) or an array of one or more other forms of data such as an array of (intermediate) graphics data (including, but not limited to depth value data, surface normal vector data, relief map data, luminance data, tangent space data, distance filed data, etc.). An array of image data may comprise, for example, an array of image data from a (digital) camera, an array of video stream data, a texture map, or an array of graphics data such as a rendered frame (as described above) or other (intermediate) graphics data.

The (compressed) blocks of data can each represent any suitable and desired region (area) of the overall array of data, e.g. and in an embodiment as described above. In one embodiment, each block of data corresponds to a block of data that the data processor in question produces as its output. This is a particularly straightforward way of implementing the technology described herein, as the data processor will generate the blocks of data directly, and so there will be no need for any further processing to "produce" the data blocks that will be processed in the manner of the technology described herein.

The output buffer of the technology described herein may comprise any suitable and desired output buffer, such as a "final" output buffer for the data processing operation in question, or an initial or intermediate output buffer. The output buffer may comprise, for example, an image buffer (e.g. of a (digital) camera), a video buffer (e.g. of or for a video processor (engine)), a texture buffer, a graphics buffer (e.g. a "G-buffer"), or a frame buffer (e.g. as described above), etc. Similarly, the output buffer may be configured in any suitable and desired manner in memory, e.g. and in an embodiment as described above.

The compressed blocks of data may be written to the output buffer by any suitable and desired component of the data processing system. The compressed blocks of data are in an embodiment written to the output buffer by the same component of the data processing system that generates and/or compresses the compressed blocks of data (although this need not be the case, and in one embodiment this is not the case). Accordingly, the compressed blocks of data may be (generated and/or compressed by and) written to the output buffer by an Image Signal Processor (ISP) (e.g. of a (digital) camera), a CPU, a display controller, or a (e.g. standalone) compressor that may receive and compress uncompressed blocks of data to generate the compressed blocks of data, as well as by (e.g. as described above) a graphic processor (GPU), a video processor (engine), or a composition engine (a compositor), etc.

The compression scheme that is used to compress the compressed blocks of data may comprise any suitable and desired compression scheme, e.g. and in an embodiment as discussed above, such as the AFBC compression scheme or ASTC compression scheme (as described above).

The compressed block of data may be read from the output buffer by any suitable and desired component of the data processing system. The compressed block of data may be read from the output buffer by the same component of the data processing system which wrote the compressed block of data to the output buffer, or by another (different) component.

The meta-data may be acquired from the compressed block of data in any suitable and desired manner, e.g. and in an embodiment as described above. This may be done by and suitable and desired component of the data processing system, such as the component of the data processing system that read the block of data, or by another (different) component.

The block of data may then be processed (using the meta-data to affect the processing) by any suitable and desired component of the data processing system, such as the component that read the block of data or by another (different) component e.g. to which the read block of data is passed.

Accordingly, the compressed block of data may be read from the output buffer and/or processed (using the meta-data) and/or the meta-data may be acquired from the compressed block of data by an Image Signal Processor (ISP) (e.g. of a (digital) camera), a CPU, a display controller, a (e.g. standalone) image processor, a graphic processor (GPU), a video processor (engine), or a composition engine (a compositor), etc.

The meta-data acquired from the compressed block of data may comprise any suitable and desired such meta-data. As discussed above, in an embodiment the meta-data comprises information representative of the variation in the data (e.g. the frequency components of the data) in the block of data, that is in an embodiment generated as part of the compression operation.

The block of data may be processed in any suitable and desired manner, and the meta-data may be used to affect the processing of the block of data in any suitable and desired manner.

As discussed above, in an embodiment, the method comprises choosing (and the data processing system comprises processing circuitry arranged to choose), using the meta-data, between one of a plurality of processes to use to process the block of data. For example, it would be possible to select between different types of processing to process the block of data, to perform one or more "standard" processing steps when processing the block of data, to omit one or more processing steps when processing the block of data, to include one or more (additional) processing steps when processing the block of data, to perform a "normal" or intermediate level of processing when processing the block of data, to perform a less detailed (e.g. lower precision) level of processing when processing the block of data, and/or to perform a more detailed (e.g. higher precision) level of processing when processing the block of data, e.g. where appropriate.

In an embodiment, where the meta-data comprises information representative of the variation in the data (e.g. the frequency components of the data) in the block of data, then the method comprises choosing (and the data processing system comprises processing circuitry arranged to choose), depending on the information representative of the variation in the data in the block of data, between one of a plurality of processes to use to process the block of data.

For example, where the meta-data indicates that the variation in the data in the block of data is relatively small (e.g. the block of data comprises relatively low frequency components or only "DC" components), then one or more processing steps may be omitted when processing the block of data, and/or the block of data may be processed using a less detailed (e.g. lower precision) level of processing. Correspondingly, where the meta-data indicates that the variation in the data in the block of data is relatively large (e.g. the block of data comprises relatively high frequency components), then one or more (additional) processing steps may be included when processing the block of data, and/or the block of data may be processed using a more detailed (e.g. higher precision) level of processing. Where the meta-data indicates that the variation in the data in the block of data has a "normal" or intermediate value, then one or more "standard" processing steps may be performed when processing the block of data, and/or the block of data may be processed using a "normal" or intermediate level of processing.

In an embodiment, the choice between the plurality of processes to use to process the block of data may be made using one or more threshold values, in an embodiment by comparing the information representative of the variation in the data in the block of data (e.g. the degree of variation indicated by that information) to the one or more threshold values.

There may be a single threshold value, e.g. such that where the variation in the data in the block of data is greater than (or equal to) the threshold value then the variation in the data in the block of data may be deemed to be "normal" or relatively large (e.g. as described above), and/or where the variation in the data in the block of data is less than (or equal to) the threshold value then the variation in the data in the block of data may be deemed to be "normal" or relatively small (e.g. as described above). Alternatively, there may be plural threshold values, e.g. such that a relatively large, a relatively small and one or more intermediate levels in the variation in the data in the block of data may be defined and used (e.g. as described above).

In these embodiments, the level(s) of the one or more threshold levels may be selected and defined as desired.

It would also be possible to omit processing of the block of data altogether, e.g. where appropriate.

Thus, in an embodiment, the method comprises determining (and the data processing system comprises processing circuitry arranged to determine), using the meta-data (e.g. and in an embodiment based on the information representative of the variation in the data), whether or not the block of data should be processed. For example, where the meta-data indicates that the variation in the data in the block of data is relatively small (e.g. the block of data comprises relatively low frequency components or only "DC" components) (e.g. relative to a threshold), then the block of data may be other than (not) processed.

It is believed that the idea of determining whether or not a block of data should be processed on the basis of meta-data acquired from a compressed block of data may be new and advantageous in its own right.

Thus, a further embodiment of the technology described herein comprises a method comprising:

storing data in an output buffer by writing compressed blocks of data representing particular regions of an output array of data to the output buffer;

reading a compressed block of data representing a particular region of the output array of data from the output buffer;

acquiring meta-data from the compressed block of data; and determining, using the meta-data, whether the block of data should be processed.

A further embodiment of the technology described herein comprises a data processing system comprising:

processing circuitry arranged to generate data to form an output array of data;

processing circuitry arranged to store the generated data in an output buffer by writing compressed blocks of data representing particular regions of the output array of data to the output buffer;

processing circuitry arranged to read a compressed block of data representing a particular region of the array of data from the output buffer;

processing circuitry arranged to acquire meta-data from the compressed block of data; and processing circuitry arranged to determine, using the meta-data, whether the block of data should processed.

As will be appreciated by those skilled in the art, these embodiments of the technology described herein can and in an embodiment do include any one or more or all of the optional features of the technology described herein.

Thus, for example, the compression scheme that is used to compress the compressed blocks of data in an embodiment comprises the AFBC compression scheme or ASTC compression scheme, e.g. and in an embodiment as described above. Equally, the meta-data acquired from the compressed block of data in an embodiment comprises information representative of the variation in the data (e.g. the frequency components of the data) in the block of data, e.g. and in an embodiment as described above.

Where (if) it is determined that the block of data should be processed, then the block of data is in an embodiment processed, optionally using the meta-data to affect the processing of the block of data, e.g. and in an embodiment as described above. Where (if) it is determined that the block of data should be other than (not) processed, then the block of data is in an embodiment other than (not) processed, e.g. and in an embodiment as described above.

In an embodiment, where one or more processing steps are omitted when processing the block of data, where a less detailed (e.g. lower precision) level of processing is performed when processing the block of data, and/or where processing of the block of data is (altogether) omitted, then the processing and/or bandwidth that is saved in this manner is at least partially used elsewhere, e.g. to enhance the processing of one or more other blocks of data (e.g. of the array of data or of another (different) array of data). Thus, for example, one or more (additional) processing steps may be included when processing another block of data, a more detailed (e.g. higher precision) level of processing may be performed when processing another block of data, and/or another block of data, e.g. that would otherwise not be processed, may be processed.

Thus, it will be appreciated that in an embodiment, the meta-data can be used to selectively "rebalance" or distribute the processing resources and/or to remove redundancy, e.g. when processing one or more arrays of data. That is, the meta-data may be used to selectively bypass, eliminate or reduce the processing of the block of data, and/or to enhance the processing of one or more other (different) blocks of data.

As discussed above, in an embodiment, the step of processing the block of data comprises detecting (extracting) feature information of the block of data (e.g. detecting edges in the block of data), wherein the meta-data is used to affect the feature detection for the block of data. In one such embodiment, the array of data comprises an array of image data acquired (and in an embodiment compressed) by an Image Signal Processor (ISP), e.g. of an image processing system or a machine vision system.

In one such embodiment, where the meta-data indicates that the variation in the data (e.g. colour or luminance) in the block of data is relatively small (e.g. the block of data comprises relatively low frequency components or only "DC" data), then one or more processing steps in the feature detection can be omitted, a less detailed (e.g. lower precision) level of feature detection may be performed for the block of data, and/or the feature detection processing for the block of data can be (altogether) omitted.

In an embodiment, the output array of data comprises volumetric data. In these embodiments, each block of data may represent a particular region of a 3D volumetric form (rather than a particular region of a 2D image).

In one such embodiment, the volumetric data comprises volumetric graphics data, and the processing operation comprises a graphics processing operation that uses the volumetric graphics data (such as graphics processing operations involving ray casting, particle effects, etc.). In another such embodiment, the volumetric data comprises a 3D computer vision reconstruction of image data, and the processing operation comprises a computer vision processing operation that uses the 3D reconstruction.

In an embodiment, where the meta-data for a block of data of the volumetric data indicates that the variation in the data is relatively small, then one or more processing steps in the processing can be omitted, a less detailed (e.g. lower precision) level of processing may be performed for the block of data, and/or the processing of the block of data can be (altogether) omitted (e.g. as described above). As will be appreciated by those having skill in the art, volumetric data can often comprise relatively large regions having relatively sparse data (i.e. low "entropy"), and thus the techniques of the technology described herein can be particularly useful in situations where volumetric data is to be processed.

In various embodiments, the step of processing the block of data comprises using the block of data to generate a second (e.g. final) output array of data.

In these embodiments, the step of determining, using the meta-data, whether (or not) the block of data should be processed may comprise using the meta-data to determine whether (or not) the block of data should be used to generate the second (final) output array of data. Equally, the step of using the meta-data to affect the processing the block of data may comprise using the meta-data to affect the processing of the block of data when generating the second (final) output array of data.

The block of data may be used to generate the second (final) output array of data in any suitable and desired manner. The block of data is in an embodiment used to generate the second (final) output array of data together with one or more other blocks of data, e.g. by combining the blocks of data in some way. The one or more other blocks of data may be from the same output array of data as the block of data and/or from one or more other (different) output arrays of data.

In an embodiment, the (original) array of data may comprise an array of (intermediate) graphics data (such as a "render to texture" output), e.g. for use in generating a second (final) output array of data (e.g. a frame for display). This may be the case, for example, where the data processing system is arranged to perform deferred shading. In these embodiments, the output buffer will in an embodiment comprise a so-called "G-buffer" that stores multiple render targets for use in generating the second (final) output array of data (e.g. frame for display).

As is known in the art, in deferred shading, multiple render targets (of e.g. colour data, depth data, surface normals, light source masks, opacity ordering data, other attributes, etc.) are generated for a given output, e.g. frame for display. A final output array of data (e.g. frame for display) is generated using the multiple render targets, e.g. by combining the multiple render targets in some way, in a so-called "resolve pass".

Thus, in one embodiment, the step of using the block of data to generate a second (final) output array of data may comprise performing a (deferred shading) resolve pass to generate the second (final) output array of data.

In one such embodiment, where the meta-data indicates that the variation in the data in the block of data is relatively small (e.g. the block of data comprises relatively low frequency components or only "DC" data), then one or more processing steps in the resolve pass can be omitted, a less detailed (e.g. lower precision) level of processing may be performed for the block of data in the resolve pass, and/or the resolve pass processing for the block of data can be (altogether) omitted (i.e. the block of data can be omitted from processing in the resolve pass). Additionally or alternatively, where the meta-data indicates that the variation in the data in the block of data is relatively large (e.g. the block of data comprises relatively high frequency components), then one or more (additional) processing steps in the resolve pass can be included when processing the block of data, and/or a more detailed (e.g. higher precision) level of processing may be performed for the block of data in the resolve pass.

In an embodiment, using the meta-data to affect the processing of the block of data may comprise comparing the meta-data of the block of data to the meta-data of one or more other (different) blocks of data, and the processing of the block of data may be affected on the basis of the comparison.

Correspondingly, in an embodiment, the step of determining, using the meta-data, whether or not the block of data should be processed may comprise comparing the meta-data of the block of data to the meta-data of one or more other (different) blocks of data, and then determining whether or not the block of data should be processed on the basis of the comparison.

Additionally or alternatively, in another embodiment, the meta-data may be used to determine whether one or more other (different) blocks of data should be processed and/or to affect the processing of one or more other (different) blocks of data.

It is believed that the ideas of determining whether one or more other (different) blocks of data should be processed and/or affecting the processing of one or more other (different) blocks of data on the basis of meta-data acquired from a compressed block of data may be new and advantageous in their own right.

Thus, a further embodiment of the technology described herein comprises a method comprising:

storing data in an output buffer by writing compressed blocks of data representing particular regions of an output array of data to the output buffer;

reading a compressed block of data representing a particular region of the output array of data from the output buffer;

acquiring meta-data from the compressed block of data; and determining, using the meta-data, whether one or more other blocks of data should be processed.

A further embodiment of the technology described herein comprises a data processing system comprising:

processing circuitry arranged to generate data to form an output array of data;

processing circuitry arranged to store the generated data in an output buffer by writing compressed blocks of data representing particular regions of the output array of data to the output buffer;

processing circuitry arranged to read a compressed block of data representing a particular region of the array of data from the output buffer;

processing circuitry arranged to acquire meta-data from the compressed block of data; and processing circuitry arranged to determine, using the meta-data, whether one or more other blocks of data should processed.

Where (if) it is determined that one or more other (different) blocks of data should be processed, then the one or more other (different) blocks of data are in an embodiment processed, optionally using the meta-data to affect the processing of the one or more other (different) blocks of data, e.g. and in an embodiment as described above. Where (if) it is determined that one or more other (different) blocks of data should be other than (not) processed, then the one or more other (different) blocks of data are in an embodiment other than (not) processed, e.g. and in an embodiment as described above. Where the one or more other (different) blocks of data are other than (not) processed, then the processing and/or bandwidth that is saved in this manner may be at least partially used elsewhere, e.g. and in an embodiment as described above.

A further embodiment of the technology described herein comprises a method comprising:

storing data in an output buffer by writing compressed blocks of data representing particular regions of an output array of data to the output buffer;

reading a compressed block of data representing a particular region of the output array of data from the output buffer;

acquiring meta-data from the compressed block of data; and processing one or more other blocks of data;

wherein the meta-data is used to affect the processing of the one or more other blocks of data.

Another embodiment of the technology described herein comprises a data processing system comprising:

processing circuitry arranged to generate data to form an output array of data;

processing circuitry arranged to store the generated data in an output buffer by writing compressed blocks of data representing particular regions of the output array of data to the output buffer;

processing circuitry arranged to read a compressed block of data representing a particular region of the array of data from the output buffer;

processing circuitry arranged to acquire meta-data from the compressed block of data; and processing circuitry arranged to process one or more other blocks of data;

wherein the meta-data is used to affect the processing of the one or more other blocks of data.

As will be appreciated by those skilled in the art, these embodiments of the technology described herein can and in an embodiment do include any one or more or all of the optional features of the technology described herein.

Thus, for example, the compression scheme that is used to compress the compressed blocks of data in an embodiment comprises the AFBC compression scheme or ASTC compression scheme, e.g. and in an embodiment as described above. Equally, the meta-data acquired from the compressed block of data in an embodiment comprises information representative of the variation in the data (e.g. the frequency components of the data) in the block of data, e.g. and in an embodiment as described above.

In these embodiments, the one or more other (different) blocks of data may be from the same output array of data (e.g. that is stored in the output buffer) and/or from one or more other output (different) arrays of data (e.g. that may be stored in the output buffer and/or in one or more other output buffers). The one or more other (different) blocks of data in an embodiment comprise one or more compressed blocks of data, which are in an embodiment compressed using the same compression scheme as the compressed block of data (although this is not necessary). In an embodiment, processing the one or more other (different) blocks of data may comprise decompressing the compressed one or more other blocks of data, and processing the one or more other decompressed blocks of data, wherein the meta-data is in an embodiment used to affect processing of the one or more other decompressed blocks of data.

These embodiments may be used, for example, in stereoscopic reconstruction of 3D images from plural 2D images. In one such embodiment, the output array of data may comprise 2D image data, and the step of processing the block of data may comprise using the block of data (together with one or more other (different), in an embodiment corresponding, blocks of data from one or more other (different) arrays of 2D image data) to generate a 3D image. In this case, where the two blocks of data have the same or sufficiently similar meta-data (i.e. such that they have the same or sufficiently similar variations in the data in the blocks of data), then these blocks of data may be determined to be other than (not) useful for the stereoscopic reconstruction process. Accordingly, the processing for these blocks of data can be omitted or reduced (e.g. as described above).

In an embodiment, using the meta-data to affect the processing of the block of data (and/or of one or more other (different) blocks of data) comprises using the meta-data to determine a level of detail or precision at which the block of data in question (and/or one or more other blocks of data) is processed.

In one such embodiment, the meta-data may be used to determine the rate at which or the sample count with which (i.e. the level of detail or precision) data in the block of data (and/or one or more other blocks of data) is sampled, e.g. for use in generating a or the second (final) output array of data.

As is known in the art, when generating a second (final) output array of data from one or more (intermediate) arrays of data, the one or more (intermediate) arrays of data must be sampled. Typically (e.g. where the one or more (intermediate) arrays of data have the same size as the second (final) output array of data), the sampling may be done using 1:1 sampling, that is, for each data element (e.g. fragment) in the second (final) output array of data, a (single) corresponding data element or region is sampled from the one or more (intermediate) arrays of data, and is used to generate the data value for that element.

However, it is also possible to sample the one or more (intermediate) arrays of data multiple times for each data element (fragment) in the second (final) output array of data (i.e. to "supersample" or "multisample" the one or more (intermediate) arrays of data). Conversely, it is possible to use a single sample of the one or more (intermediate) arrays of data in respect of multiple data elements (fragments) in the second (final) output array of data, i.e. to use more coarse (sparse) sampling.

Furthermore, it is possible to select between these arrangements, e.g. to dynamically switch between these arrangements, e.g. in a "variable rate fragment evaluation" technique. This can reduce the resources (e.g. in terms of processing, memory bandwidth and power) required for generating the second (final) output array of data, or can allow resources to be spent more efficiently, e.g. by processing regions of the array that have relatively high "entropy" in more detail than regions of the array that have relatively low "entropy".

According to an embodiment, the meta-data acquired from the block of data may be used to (dynamically) determine the rate at which or sample count with which (i.e. the level of detail or precision) the data in the block of data (and/or one or more other (different) blocks of data) should be sampled for use in generating the other (final) output array of data. That is, in an embodiment, the meta-data may in an embodiment be used to select the sampling rate or sample count in a variable rate fragment evaluation technique.

For example, the meta-data may be used to choose between 1:1 sampling (i.e. where for each data element (fragment) in the second (final) output array of data, a (single) corresponding data element or region is sampled from the one or more (intermediate) arrays of data), one or more supersampling or multisampling rates or sample counts (i.e. where the one or more (intermediate) arrays of data are sampled multiple times for each data element (fragment) in the second (final) output array of data), and/or one or more coarse (sparse) sampling rates or sample counts (i.e. where a single sample of the one or more (intermediate) arrays of data is used in respect of multiple data elements (fragments) in the second (final) output array of data).

In one such embodiment, where the meta-data indicates that the variation in the data in the block of data is relatively small (e.g. the block of data comprises relatively low frequency components or only "DC" data), then relatively coarse (sparse) sampling may be used to sample the data in the block of data. Where the meta-data indicates that the variation in the data in the block of data is relatively large (e.g. the block of data comprises relatively high frequency components), then in an embodiment relatively fine (detailed) sampling (supersampling or multisampling) may be used to sample the data in the block of data. Where the meta-data indicates that the variation in the data in the block of data has some intermediate value, then in an embodiment an intermediate sampling rate or sample count may be used to sample the data in the block of data.

It would also be possible to use the meta-data to (dynamically) choose between different supersampling or multisampling rates or sample counts and/or coarse (sparse) sampling rates or sample counts (and in one embodiment this is done). For example, the meta-data may be used to choose between one or more relatively course (sparse) supersampling or multisampling rates or sample counts (e.g. 2×2 or 4×4 supersampling or multisampling) and/or one or more relatively fine supersampling or multisampling rates or sample counts (e.g. 8×8 or 16×16 supersampling or multisampling).

These embodiments may (also) be used, for example, to address problems with shader based aliasing. Shader aliasing (that is, visual disturbances primarily caused by high quantisation of contrasting neighbouring pixels as they switch between quantised states, e.g. from frame to frame) can occur when the sampled array of data (texture) is under-sampled or is on a boundary condition between two samples.

Accordingly, in an embodiment, by using the meta-data to select the number of sub-samples (the supersampling or multisampling rate or sample count), e.g. to increase the number of sub-samples where the variation in the data in the block of data is relatively high, the transitions from frame to frame can be smoothed. This represents a convenient and efficient way to address shader aliasing, e.g. without having to implement a "full" supersampling or temporal anti-aliasing scheme, which can be relatively expensive (e.g. in terms of the processing required) and therefore, e.g., undesirable for mobile devices.

It is believed that the idea of determining on the basis of meta-data acquired from a compressed block of data the sampling rate or sample count to use when processing the block of data may be new and advantageous in its own right.

Thus, a further embodiment of the technology described herein comprises a method comprising:

storing data in an output buffer by writing compressed blocks of data representing particular regions of a first output array of data to the output buffer;

reading a compressed block of data representing a particular region of the first output array of data from the output buffer;

acquiring meta-data from the compressed block of data; and using the block of data to generate a second output array of data;

wherein the meta-data is used to determine the rate or sample count at which data in the block of data is sampled when generating the second output array of data.

A further embodiment of the technology described herein comprises a data processing system comprising:

processing circuitry arranged to generate data to form a first output array of data;

processing circuitry arranged to store the generated data in an output buffer by writing compressed blocks of data representing particular regions of the first output array of data to the output buffer;

processing circuitry arranged to read a compressed block of data representing a particular region of the first array of data from the output buffer;

processing circuitry arranged to acquire meta-data from the compressed block of data; and processing circuitry arranged to use the block of data to generate a second output array of data;

wherein the meta-data is used to determine the rate or sample count at which data in the block of data is sampled when generating the second output array of data.

As will be appreciated by those skilled in the art, these embodiments of the technology described herein can and in an embodiment do include any one or more or all of the optional features of the technology described herein.

Thus, for example, the compression scheme that is used to compress the compressed blocks of data in an embodiment comprises the AFBC compression scheme or ASTC compression scheme, e.g. and in an embodiment as described above.

Equally, the meta-data acquired from the compressed block of data in an embodiment comprises information representative of the variation in the data (e.g. the frequency components of the data) in the block of data, e.g. and in an embodiment as described above. According to one such embodiment, the information representative of the variation in the data in the block of data is used to determine the rate or sample count at which data in the block of data is sampled when generating the second output array of data, e.g. and in an embodiment as described above.

In an embodiment, plural blocks of data of the first array of data are used to generate the second output array of data. In these embodiments, a rate or sample count may be determined for each block of data, and each block of data may be sampled using its own determined rate or sample count (e.g. determined on the basis of meta-data as described above or otherwise). Alternatively, a (single) rate or sample count may be used for plural or all of the blocks of data of the first array of data. The (single) rate or sample count may be, for example, an average (median, mode, mean, etc.) of plural rates or sample counts determined for each of the plural blocks of data, or the highest determined rate or sample count. In one embodiment, the determined rate or sample count in respect of the block of data in question may be used when sampling some or all of the (other blocks of data of the) first array of data.

In an embodiment, plural arrays of data (e.g. textures) are sampled and used when generating the second output array of data. In these embodiments, one or more rates or sample counts may be determined in respect of each array of data, and each sampled array of data may be sampled using its own determined sampling rate(s) or sample count(s) (e.g. determined on the basis of meta-data as described above or otherwise). Alternatively, a (single) rate or sample count or set of rates or sample counts may be used for plural or all of the sampled arrays. The (single) rate(s) or sample count(s) may be, for example, an average (median, mode, mean, etc.) of plural (sets of) rates or sample counts determined for each of the plural sampled arrays, or the highest determined rate(s) or sample count(s). In one embodiment, the rate(s) or sample count(s) determined in respect of the first array of data may be used when sampling some or all of the other arrays of data.

It would also be possible to sample a block of data and/or an array of data using different rates or sample counts when generating the second output array of data. For example, a given block of data or array of data may be sampled using plural different rates or sample counts for plural different processing operations performed when generating the second output array of data. In these embodiments, the sampling rate or sample count may be selected depending on the (properties of the) particular processing operation(s), e.g. on the basis of the "sensitivity" of the processing operation(s) to the variation in the data in the block of data.

In an embodiment, the block of data and/or one or more other blocks of data are used to generate plural second output arrays of data. In these embodiments, a rate or sample count or set of rates or sample counts may be determined and used in respect of each second output array of data. Alternatively, a (single) rate or sample count or set of rates or sample counts may be used for plural or all of the second output arrays of data. The (single) rate(s) or sample count(s) may be, for example, an average (median, mode, mean, etc.) of plural (sets of) rates or sample counts determined in respect of each of the plural second output arrays of data, or the highest (maximum) determined rate(s) or sample count(s). In one embodiment, the rate(s) or sample count(s) determined in respect of the second output array of data in question may be used in respect of some or all of the other second output arrays of data.

In one such embodiment, the plural second output arrays of data comprise one or more pairs of stereoscopic images (i.e. where each pair of images comprises one image for the right eye and one image for the left eye, which differ according to a transform related to the point of view for the image). In these embodiments, the same rate or sample count (or the same set of rates or sample counts) may be used for both images of the stereoscopic image pair, e.g. so as to reduce or avoid possible differences, e.g. in aliasing, between the images that might otherwise occur if different sampling rate(s) or sample count(s) were used when generating each image of the stereoscopic image pair.

In an embodiment, the same rate or sample count is used in respect of each pair of corresponding fragments of the stereoscopic image pair. In an embodiment, a rate or sample count is (independently) determined in respect of each fragment of each pair of corresponding fragments, and the maximum determined rate or sample count, or the average (median, mode, mean, etc.) of the two determined rates or sample counts, is used in respect of the pair of corresponding fragments.

In an embodiment, other information may be used together with the meta-data to determine the rate or sample count at which data in the block of data is sampled when generating the second output array of data. For example, the generated second output array of data may be modified, e.g. according to a transform, and information relating to the modification may be used together with the meta-data to determine the rate or sample count at which data in the block of data is sampled when generating the second output array of data.

In one such embodiment, the second output array of data comprises an array of image data for display on a virtual reality display device that comprises a lens (e.g. for increasing the field of vision of the virtual reality display device), and the array of image data is modified according to a transform that describes the curvature of the lens, before being displayed via the lens. This modification can have the effect of "stretching" the image, and can cause visible aliasing in regions of the image that are stretched.

Accordingly, in an embodiment, information relating to the transform is used together with the meta-data to determine the rate or sample count at which data in the block of data is sampled when generating the second output array of data. In an embodiment, a relatively high rate or sample count is used for regions of the second output array of data that are (to be) stretched (and vice versa). This is in an embodiment done such that the final image as presented to the user through the lens has a constant or near-to-constant pixel size throughout the image. This will have the effect of reducing or avoiding visible aliasing in the image, without e.g. increasing the sampling rate or sample count throughout the image, which can be costly e.g. in terms of computational power, bandwidth and power consumption.

In these embodiments, it would be possible for the generated second output array of data to be modified after it has been generated (rendered) and written to a buffer (e.g. frame buffer). Alternatively, the modification may be integrated together with the generation (rendering), e.g. such that there would then be no need to write the unmodified image to a buffer before the unmodified image is modified and the modified image is sent for display. As will be appreciated by those having skill in the art, this can then further reduce the power and bandwidth requirements of the system.

In one such embodiment, the output buffer comprises a G-buffer, and the block of data is used in a (deferred shading) resolve pass to generate the second output array of data. It would be possible for the second output array of data to be written to a buffer (e.g. frame buffer) before being modified (e.g. according to a transform as described above) and then passed onwards for display. However, in an embodiment, the (deferred shading) resolve pass and the modification are integrated together, e.g. such that there is no need to write the unmodified image to the buffer before the unmodified image is modified and the modified image is sent for display.

Although the above embodiments have been described in terms of processing a single block of data, it will be appreciated that they can be (and in an embodiment are) applied to multiple blocks of data e.g. of the array of data, in an embodiment on a block-by-block basis. Once each of the blocks of data in the array of data that is to be processed has been processed, the process of the technology described herein may be repeated for the next array of data to be processed and so on.

The technology described herein can be implemented in any suitable system, such as a suitably configured microprocessor based system. In some embodiments, the technology described herein is implemented in computer and/or micro-processor based system.

In some embodiments, the processor comprises, and/or is in communication with, one or more memories and/or memory devices that store the data described herein, and/or store software for performing the processes described herein. The processor may also be in communication with a host microprocessor, and/or with a display for displaying images based on the data generated by the processor.

The various functions of the technology described herein can be carried out in any desired and suitable manner. For example, the functions of the technology described herein can be implemented in hardware or software, as desired. Thus, for example, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner. Similarly, the display that the windows are to be displayed on can be any suitable such display, such as a display screen of an electronic device, a monitor for a computer, etc.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

The technology described herein is in an embodiment implemented in a portable device, such as, and in an embodiment, a mobile phone or tablet.

The technology described herein is applicable to any suitable form or configuration of graphics processor and renderer, such as processors having a "pipelined" rendering arrangement (in which case the renderer will be in the form of a rendering pipeline). It is particularly applicable to tile-based graphics processors, data processing systems, composition engines and compositing display controllers.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

FIG. 1 shows schematically an exemplary data processing system 1 that can perform the basic operation of the technology described herein.

As shown in FIG. 1, the data processing system 1 comprises a system on-chip (SoC) 2 which includes a CPU 3, a GPU 4, a video processing engine (video engine) 5, a display controller 6 and a memory controller 7, that communicate via an interconnect 8, all having access to off-chip memory 9. In this embodiment, the display controller 6 is a display controller that is itself capable of and operates to perform image processing. Separate to the SoC 2 and off-chip memory 9 is the display 10 itself.

In the embodiment shown in FIG. 1, the GPU 4 and video engine 5 include compressors (compression engines) (and corresponding de-compressors) 11 and 12, respectively, for encoding (compressing) data (e.g. a frame) to be stored in memory in a compressed form. Accordingly, the display controller 6 includes a de-compressor 13 for decompressing data (e.g. a frame to be displayed).

(Compression and de-compression of the generated frames can be provided in other ways, if desired. For example, instead of the GPU 4 and video engine 5, etc., including compression engines, a separate compression and de-compression engine that receives frames from the frame generators and compresses them before writing them to memory and that correspondingly reads frames from memory and decompresses them before providing them to the, e.g., display controller, could be provided in the system.)

In accordance with the present embodiments, a frame to be displayed is generated as desired by, for example, being appropriately rendered by the GPU 4 or video engine 5. The generated frame is then stored in a compressed form in a frame buffer within the off chip memory 9.

Figure 2:
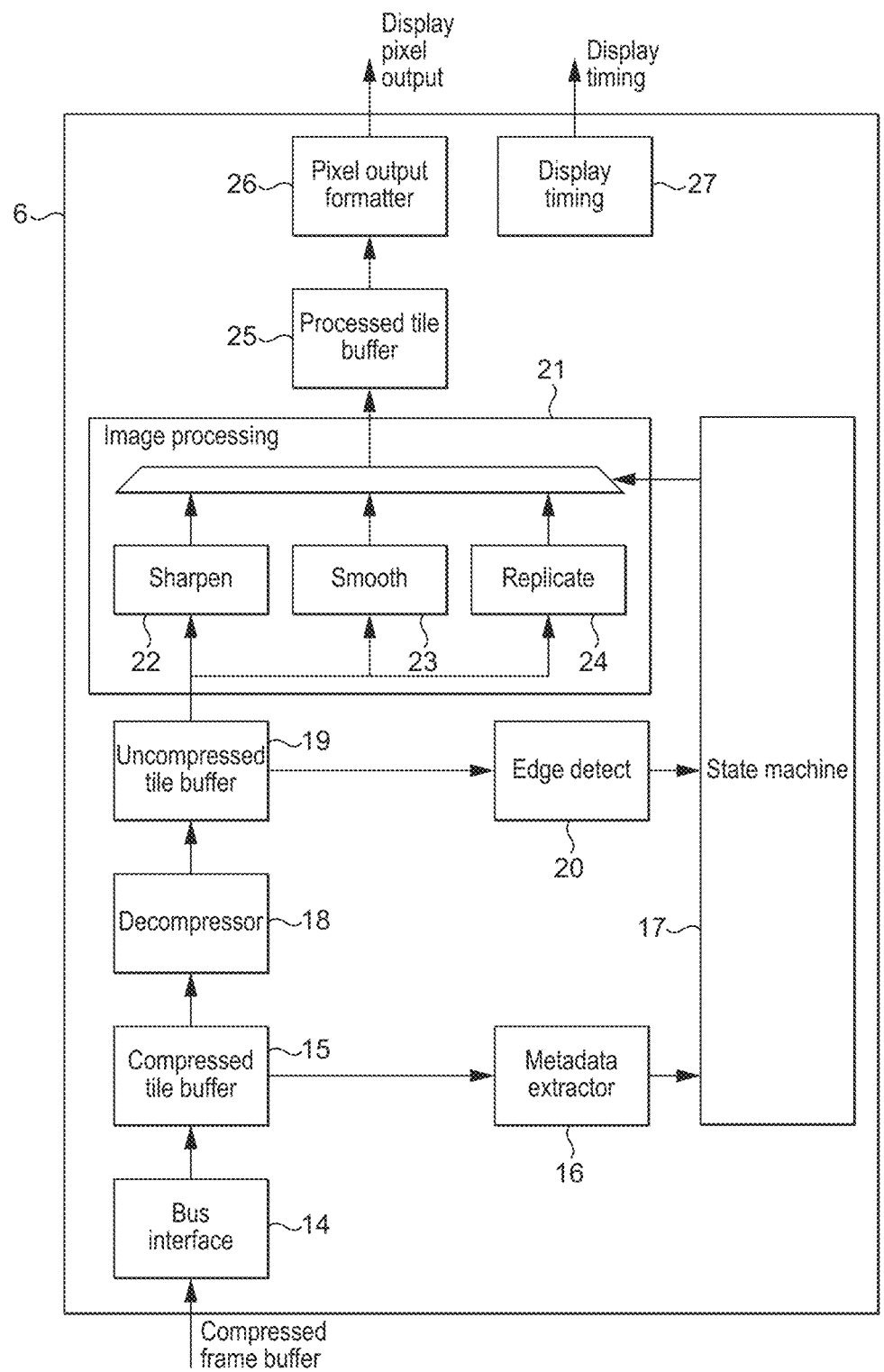
FIG. 2 shows schematically an exemplary display controller that can operate in accordance with the described embodiments of the technology described herein.

FIG. 2 shows schematically an exemplary data display controller 6 that can operate in accordance with the described embodiments of the technology described herein.

As shown in FIG. 2, the display controller 6 comprises a bus interface 14 into which (tiles of) the compressed frame is read from the frame buffer. A compressed tile buffer 15 receives (tiles of) the compressed frame from the bus interface 14. A meta-data extractor 16 is arranged to extract meta-data from (tiles of) the compressed frame in the compressed tile buffer 15 and pass this information to a state machine 17. A decompressor 18 (e.g. the decompressor 13 shown in FIG. 1) is also in data communication with the compressed tile buffer 15 and receives (tiles of) the compressed frame from the compressed tile buffer 15.

An uncompressed tile buffer 19 then receives the decompressed (tiles of) the compressed frame from the decompressor 18. An edge detect process 20 is arranged to detect edges between tiles and pass the result of this to the state machine 17. Depending on the system, the state machine 17 can selectively enable or disable the edge detection logic depending if the pixel being processed is on the perimeter of the tile or depending on the value of the meta-data.

An image processor 21 receives uncompressed (tiles of) the frame from the uncompressed tile buffer 19, along with meta-data and the result of edge detection from the state machine 17. Sharpen, smooth and replicate processes 22, 23, 24 are arranged to act on the uncompressed (tiles of) the frame from the uncompressed tile buffer 19, with the image processor 21 also receiving information from the state machine 17. The uncompressed (tiles of) the frame, once having passed through the image processor 21, are received by a processed tile buffer 25.

A pixel output formatter 26 then receives the processed (tiles of the) frame and outputs the display pixels, which are output form the display controller 6 along with display timing from a display timing module 27.

Figure 3A:
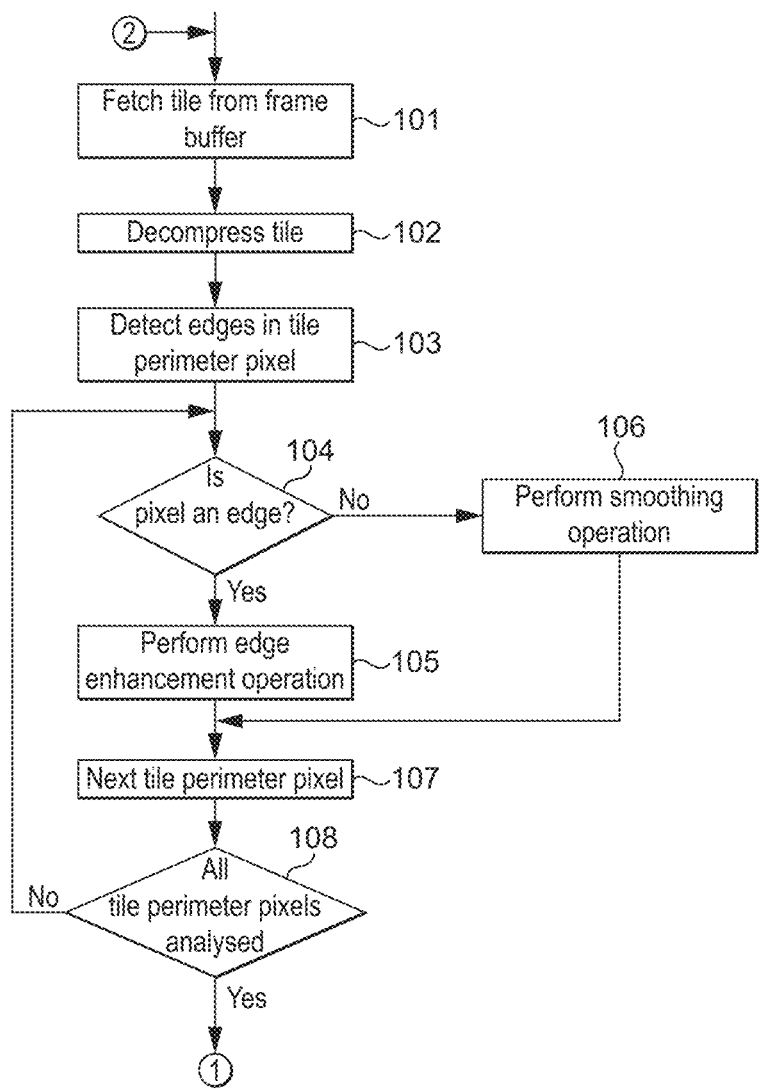
FIG. 3a and FIG. 3b show a flowchart illustrating the operation of the data processing system according to embodiments of the technology described herein.
Figure 3B:
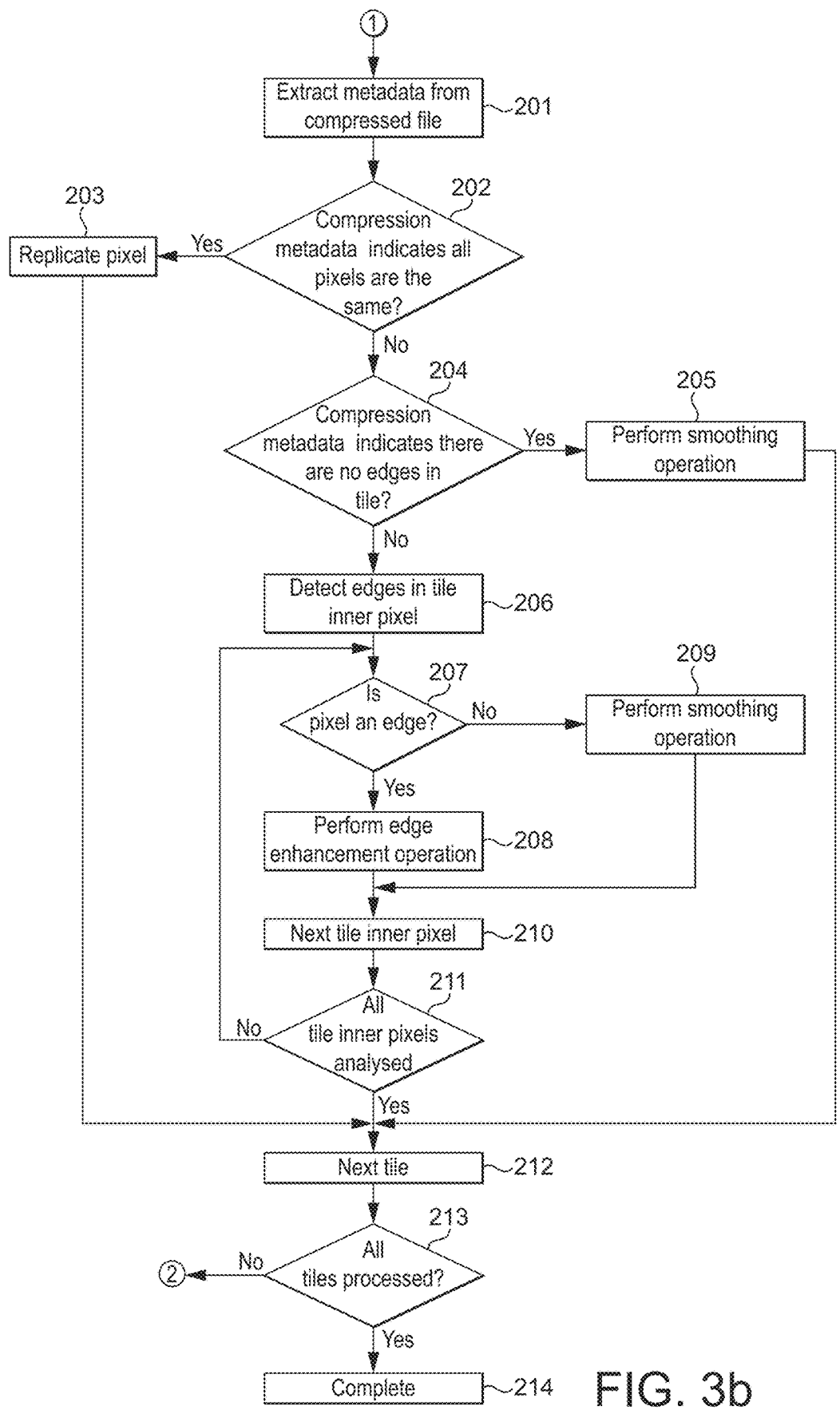

FIGS. 3a and 3b show a flowchart illustrating the operation of the data processing system according to embodiments of the technology described herein.

Operation of the embodiment shown in FIGS. 1 and 2 will now be described with reference to the flowchart of FIGS. 3a and 3b.

For each compressed tile (block of data) in a frame (array of data) to be displayed that has been generated and is being held in the frame buffer within the off chip memory 9, first the tile is fetched (read) from the frame buffer by the display controller 6 into the compressed tile buffer 15 within the display controller 6 via the bus interface 12 (step 101, FIG. 3a). Once the compressed tile is stored in the compressed tile buffer 15, meta-data can be extracted from the compressed tile by the meta-data extractor 16 (step 201, FIG. 3b). This meta-data is passed to the state machine 17 for use in later processing of the tile, as will be described below.

Using the compressed tile from the compressed tile buffer 14, the decompressor 17 decompresses the tile (step 102, FIG. 3a) and writes it to the uncompressed tile buffer 19. The edge detect process 20 then reads the uncompressed tile from the uncompressed tile buffer 19 and detects colour edges between the pixels at the perimeter of the tile and any neighbouring tiles (step 103, FIG. 3a), e.g. using the meta-data stored in the state machine 17, with the result being passed to the state machine 17 for use in processing the edge pixels of the tile.

Figure 4:
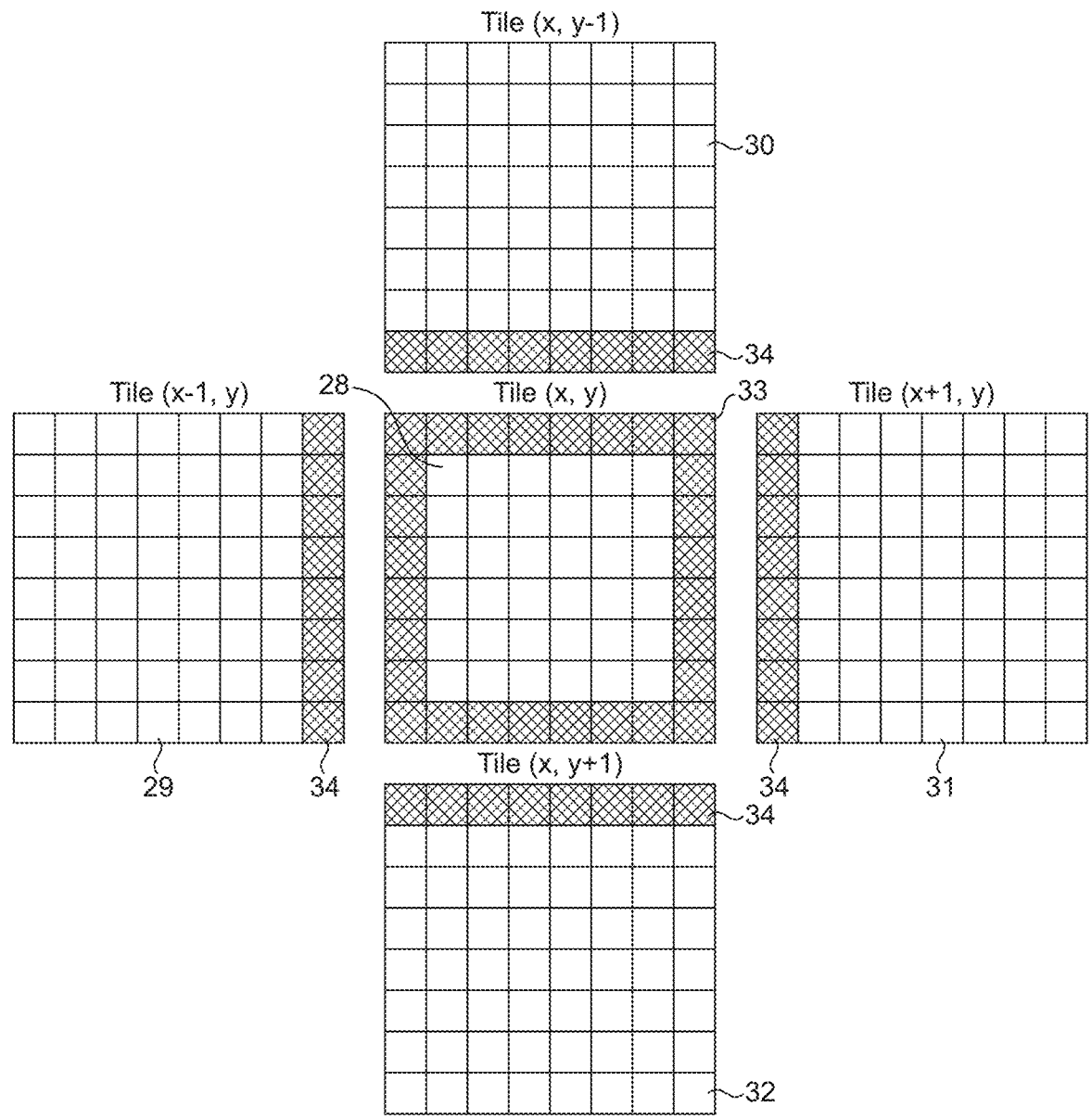
FIG. 4 and FIG. 5 show the process of edge detection for the tiles that can operate in accordance with the described embodiments of the technology described herein.

FIG. 4 shows a number of neighbouring tiles, for example as may be processed according to an embodiment of the technology described herein, and will now be used to describe the edge detect process 20.

FIG. 4 shows a tile 28 which forms part of a frame for display and which is labelled with an index (x, y) denoting its position within the frame. Surrounding the tile 28 are four adjacent tiles 29, 30, 31, 32, labelled with indices (x−1, y), (x, y−1), (x+1, y), (x, y+1) respectively. Each tile 28, 29, 30, 31, 32 is an eight by eight square such that, for each pair of adjacent tiles, eight pixels, e.g. labelled 33, at the perimeter of the central tile 28 are adjacent eight pixels, e.g. labelled 34, at the perimeter of the adjacent tile 29, 30, 31, 32. (This shape and dimensions of the tiles is given for the purposes of example only; other shapes and dimensions of tiles are possible for embodiments of the technology described herein. For example, in an embodiment the tiles are square and are of size sixteen by sixteen pixels).

Thus, edge detection is performed between the eight pixels on each side at the perimeter of the central tile 28 in FIG. 4 and the eight pixels for each of the four adjacent tiles 29, 30, 31, 32. If, for a given pixel in the tile, it is detected to be an edge (step 104, FIG. 3a), an edge enhancement operation is performed (step 105, FIG. 3a). If no edge is detected, a smoothing operation is performed (step 106, FIG. 3a), e.g. to blend between small variations in colour if the tile is being scaled.

The same process is repeated for each of the pixels at the perimeter of the tile 28 (step 107, FIG. 3a), until all the edge pixels have been analysed (step 108, FIG. 3a).

Also from the uncompressed tile buffer 19, the uncompressed tile is read into the image processor 21. Using the meta-data extracted by the meta-data extractor 16 from the state machine 17, the image processor 21 determines whether or not all the pixels in the tile are the same colour (step 202, FIG. 3b). If the pixels in the tile are the same colour, then the replicate process 24 in the image processor acts to replicate this colour across the whole tile (step 203, FIG. 3b), e.g. according to the scaling necessary for the final output display.

If the meta-data indicates that the pixels in the tile are not all the same colour, the image processor 21 determines whether or not there are one or more edges in the tile (step 204, FIG. 3b). If there are no edges in the tile, then a smoothing operation is performed on the pixels in the tile (step 205, FIG. 3b) by the smooth process 23 of the image processor 21. (N.B. it has already been determined for such a tile that the pixels are not all the same colour (step 202, FIG. 3b). Therefore the tile possesses some variation in the colour of the pixels (though not enough to constitute an edge) which, for example, if the tile is being scaled, is smoothed before the tile is output for display.)

If the meta-data indicates that there are edges within the tile (i.e. the edge pixels of the tile have already been analysed to determine whether they contribute to an edge (step 103, FIG. 3a)), the meta-data and/or the inner pixels themselves (e.g. using a two by two edge detection operation) are analysed to detect the position of the edges, i.e. the inner pixels of the tile which this affects (step 206, FIG. 3b).

Figure 5:
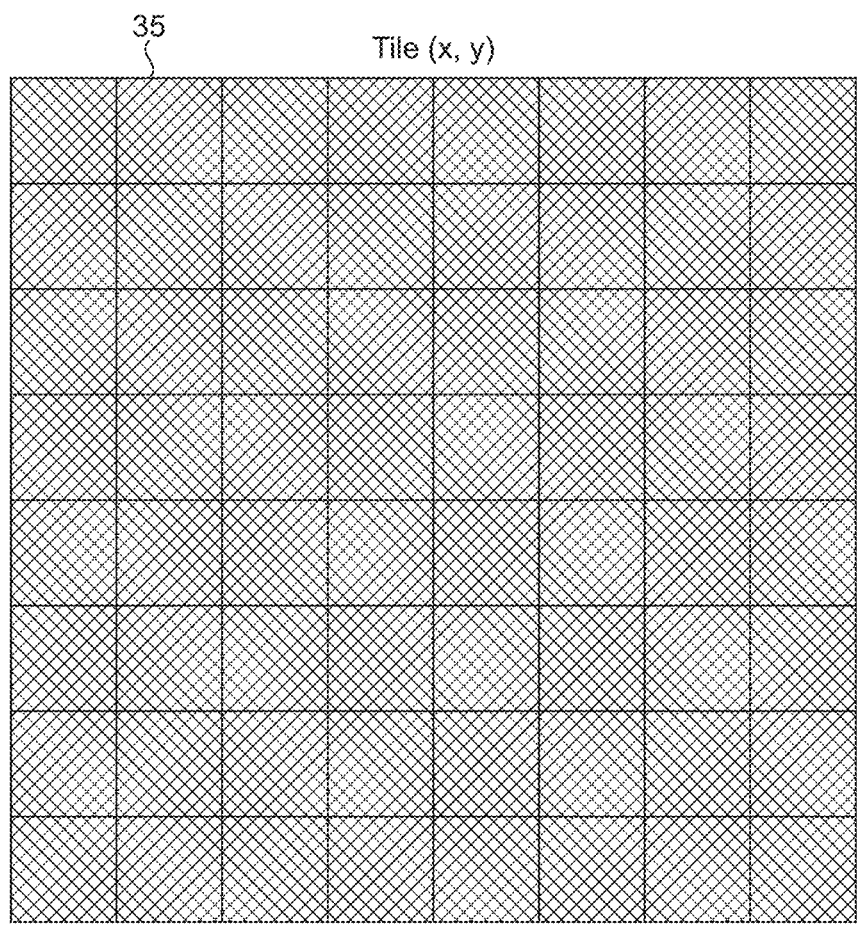

FIG. 5 shows an example eight by eight tile 35. Referring to FIG. 5, the inner pixels are the thirty-six central pixels in the tile 35, where an edge may be present between one of these pixels and any other neighbouring inner pixel or one of the pixels around the perimeter of the tile, e.g. as shown in FIG. 4. For each pixel which is determined to contribute to an edge (step 207, FIG. 3b), an edge enhancement operation is performed on these pixels in the tile (step 208, FIG. 3b) by the sharpen process 22 of the image processor 21.

For all the other inner pixels of the tile, i.e. those which do not contribute to an edge, a smoothing operation is performed on the pixels in the tile by the smooth process 23 of the image processor 21 (step 209, FIG. 3b). The processes of smoothing and edge enhancement are repeated as necessary for each inner pixel in the tile (step 210, FIG. 3b) until all the inner pixels in the tile have been analysed (step 211, FIG. 3b).

All the steps described above, with reference to FIGS. 3a and 3b, are then performed on the next tile in the frame (step 212, FIG. 3b), until all the tiles have been processed (step 213, FIG. 3b) such that the frame is complete (step 214, FIG. 3b). The processed tiles are written to the processed tile buffer 25, from where the pixel output formatter 26 formats the pixels of the processed tiles by modifying the output for the display. For example, internally the data may be in a 24-bit RGB format, whereas the display may only operate in a 6-bit RGB format. The formatted pixels are then outputted from the display controller 6, along with display timing information generated by the display timing module 27. The display timing information includes timing pulses required by the display and controls when pixels are output from the display controller.

This whole process will then be repeated for subsequent frames to be displayed (thus a new frame to be displayed will then be fetched by the display controller 6 and it will perform display modifications on the new frame to be displayed to provide a new output frame for display, and so on).

The embodiments of the technology described herein can be implemented in any desired form of data processing system that provides frames for display. Thus they could, for example, be used in a system in which a centralised compressor and/or de-compressor is used (and acts as an intermediate between the components of the SoC 2 and the off-chip memory 9). This is in contrast to the arrangement in which each of the frame generators includes a separate compressor and/or de-compressor (11, 12 and 13).

Additionally, it will be understood that although the arrangement of FIG. 1 shows only two frame generators (the GPU 4 and video engine 5), the data processing system of the technology described herein could include any number (and types) of frame generators, as appropriate.

Figure 6:
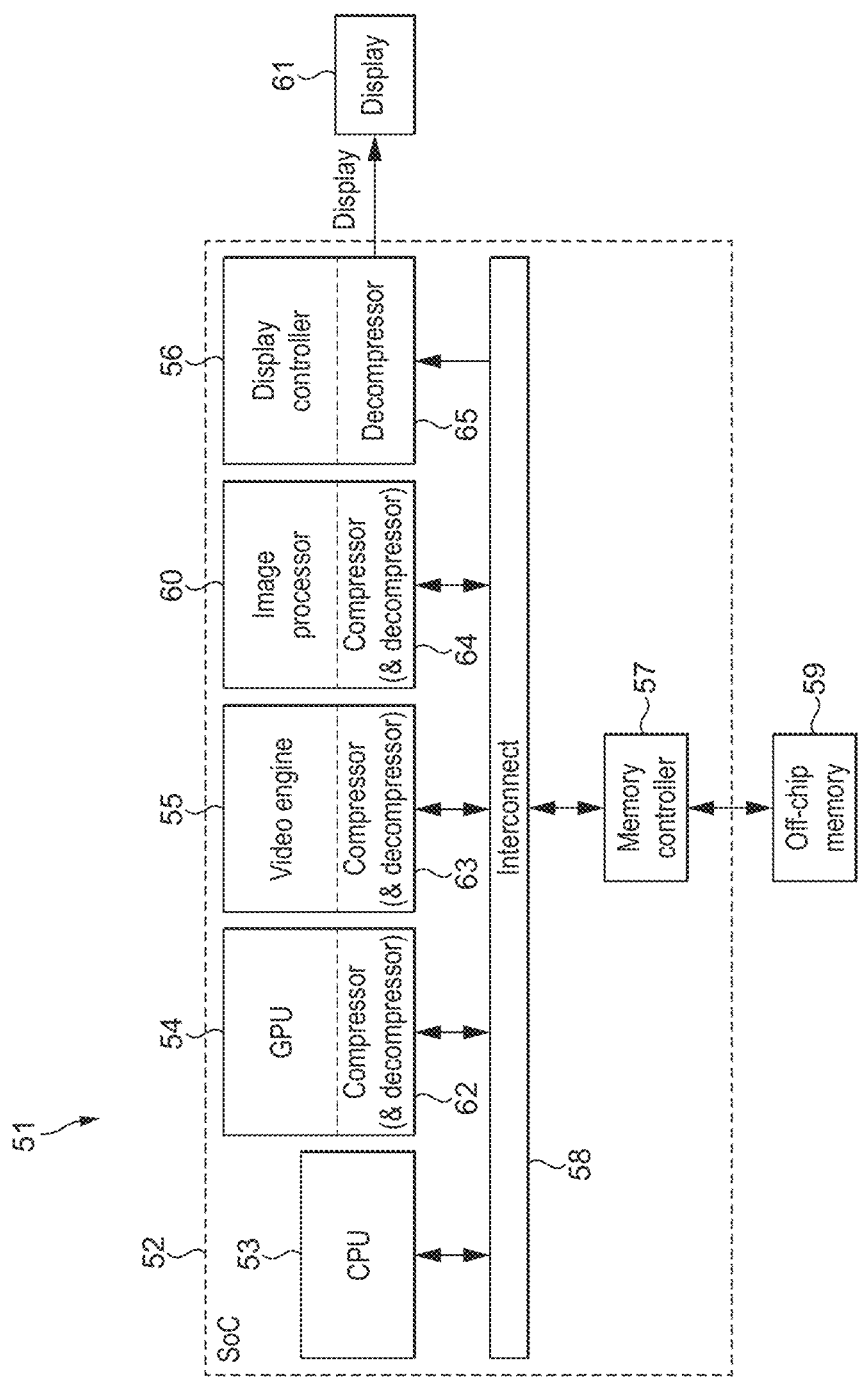
FIG. 6 shows schematically a further exemplary data processing system that can operate in accordance with the described embodiments of the technology described herein.

FIG. 6 shows schematically a similar exemplary data processing system 51 to that shown in FIG. 1, that can also perform the basic operation of the technology described herein.

The data processing system 51 shown in FIG. 6 differs from the data processing system 1 shown in FIG. 1 in that, in addition to comprising a CPU 53, a GPU 54, a video processing engine (video engine) 55, a display controller 56 and a memory controller 57 on a system on-chip 52, that communicate via an interconnect 58, all having access to off-chip memory 59, the data processing system 51 comprises an image processor 60, separate to the display controller 56. As in the data processing system 1 of FIG. 1, for the data processing system 51 of FIG. 6, separate to the SoC 52 and off-chip memory 59 is the display 61 itself.

In the embodiment shown in FIG. 6, similar to the embodiment shown in FIG. 1, the GPU 54, video engine 55 and image processor 59 include compressors (compression engines) (and corresponding de-compressors) 62, 63 and 64, respectively, for encoding (compressing) data (e.g. a frame) to be stored in memory in a compressed form. Accordingly, the display controller 56 includes a de-compressor 65 for decompressing data (e.g. a frame to be displayed).

As for the embodiment shown in FIG. 1, in accordance with the present embodiments, a frame to be displayed is generated as desired by, for example, being appropriately rendered by the GPU 54 or video engine 55. The generated frame is then stored in a compressed form in a frame buffer within the off chip memory 59.

Operation of the embodiment shown in FIG. 6 is very similar to the operation described above, with reference to FIGS. 3a, 3b, 4 and 5, for the embodiment of FIG. 1. The only difference is that it is the separate image processor 60 which reads the compressed tiles of the frame from the frame buffer and performs the edge detection, replication and smoothing processes described above using the metadata. Thus comparing this embodiment to the components shown in FIG. 2, the image processor comprises, inter alia, the decompressor 18 (e.g. the decompressor 64 shown in FIG. 6), the state machine 17, the image processor 21, the edge detect process 20, the compressed and uncompressed tile buffers 15, 19, and the associated image processor logic.

The processed tiles are then written to the processed tile buffer, from where they are read by the display controller 56. In this embodiment the display controller 56 therefore relies on the image processor 60 to perform the image processing, rather than performing the processing itself.

The display controller 56 comprises the pixel output formatter which formats the pixels of the processed tiles and outputs them from the display controller 56, along with display timing information from the display timing module.

As discussed above, in an embodiment, data is stored in a frame buffer by writing compressed blocks of data representing particular regions of a frame to be displayed to the frame buffer, a compressed block of data representing a particular region of the frame to be displayed is read from the output buffer, meta-data is acquired from the compressed block of data, and the block of data is processed wherein the meta-data is used to affect the processing of the block of data.

The Applicants have furthermore recognised that the technology described herein is applicable to and useful in a number of other arrangements.

This is because when processing large such arrays of data, such as images from cameras, video stream, texture maps, graphics buffers and frame buffers, etc. (e.g. comprising image data, including, but not limited to RGB, RGBA, sRGBA, YUV, etc., or other forms of abstract data, including, but not limited to depth values, surface normal vectors, relief map elements, luminance values, tangent space data or distance field data, etc.), it is often the case that the amounts of "entropy" (i.e. regions of interest) vary greatly across the array.

Many Graphics, GPU Compute or High Performance Computing problems resolve to the application of a function or kernel over such arrays of data. Typically, when processing an array of data, the function or kernel is applied to all data elements within the array, with only minimal regard to the properties of the data present other than the function or kernel being mathematically viable for all possible values of the data.

This brute force approach has been cultivated by the fact that performance in desktop GPUs decays rapidly if the function or kernel becomes divergent (i.e. if it contains loops or branches), since the data elements of the array are typically processed in sub-arrays of 2×2 (or larger) elements ("quads") where the kernel instance for each 2×2 sub-array is executed in lock step for each data element of the sub-array. In the situation where one or more data elements of the sub-array features divergent behaviour in the code, the evaluation of the divergent data elements becomes serialised, rapidly reducing the throughput. Therefore it is common for kernels or functions to have an "execute always" profile. However this leads to redundant calculations being performed.

It would be possible to "pre-process" the array of data to discover the entropy, but this would require an additional pass and additional resources (e.g. in terms of computation, memory footprint and bandwidth). Furthermore, the cost of such passes increases as the array size increases.

Such approaches are inefficient (e.g. in terms of computation, memory footprint and bandwidth), particularly for mobile or low power systems and/or in situations where the array data may contain regions having highly variable "entropy".

Instead of having to process all elements of the array of data, embodiments of the technology described herein can facilitate early rejection of regions which contain low or no entropy, and can thereby reduce computation and bandwidth and can accordingly improve performance, decrease power and generally increase system level efficiency.

As discussed above, one of the "side effects" of the AFBC and ASTC encoding processes is that meta-data relating to the "frequency bands" contained within the blocks of data is produced. This information can be exploited in order to allow a system processing the array data it to eliminate processing of regions of array that have low or no entropy. The entropy threshold for eliminating such processing can be dynamically determined using the same mechanism and/or based on the (properties of the) particular processing operation(s).

Thus, embodiments of the technology described herein exploit a feature of the AFBC and ASTC compressions schemes which is a side effect of the encoding process, and so happens automatically and requires no additional processing of the array.

As discussed above, the technology described herein can be applied to a number of arrangements.

For example, the technology described herein can be applied to image processing or machine vision arrangements, e.g. for feature or edge extraction.

In one such embodiment, in a machine vision/image processing system, an incoming image is captured and prepared by the Image Signal Processing (ISP) subsystem, and the array representing the image is routinely (AFBC) encoded to reduce the internal and external system bandwidth before presentation to the rest of the system. Once encoded to an AFBC representation, the system which processes the image in order to extract feature information can query on a block by block basis whether the data array contains frequency bands of interest. For example, for edge detection the system can look for high levels of high frequency data. Regions containing only low frequency or DC data components can be bypassed, thereby avoiding processing of the image array which would result in no benefit and would effectively waste computational resources, power, and bandwidth.

The technology described herein can be applied to other image processing or machine vision arrangements, such as stereoscopic reconstructions of 3D images from multiple 2D images.

In one such embodiment, the meta-data that indicates the variation in the data in the block of data can be used to determine whether or not that block of data and/or one or more other blocks of data are useful for stereoscopic reconstruction. For example, the meta-data of a block of data from a first 2D image data array can be compared to the meta-data of another (corresponding) block of data from another 2D image data array. If the meta-data of the two blocks of data are the same or sufficiently similar, it may be determined that both of the blocks of data are not useful for stereoscopic reconstruction of the 3D image, and so the processing of these blocks of data can be omitted or reduced.

The technology described herein can also be applied in graphics arrangements, such as in adaptive G-buffer "resolve" pass evaluation.

In so-called "deferred shading", complex processing in the rendering of a 3D graphics sequence is deferred until after all the visibility, lighting/shadow contributions have been resolved. This avoids redundant processing of objects which are partially or fully occluded. The intermediate data is typically stored in two or more (e.g. at least depth and intermediate data) arrays of data known as Multiple Render Targets (MRTs), with each array representing subsets of the data (depth, light source masks, surface normal, opacity ordering, etc.) and collectively known as a G-buffer. A resolve pass generates the final image, e.g. for presentation to the display subsystem, by consuming (using) one or more sub-arrays or render targets in the G-buffer.

In an embodiment, the technology described herein is applied to the resolve pass in order to bypass the processing of certain parts of the G-buffer by evaluating the meta-data to determine whether a given region contains low or no entropy for one or more of the processing steps in the resolve pass.

The technology described herein can also be applied to adaptive evaluation of volumetric data.

In graphics rendering, rendering to volumetric forms can be expensive and is therefore often avoided or limited. However, it can be very useful to represent data in volumetric space for certain types of processing (such as ray casting, particle effects, etc.).

The techniques of the technology described herein can be applied to volumetric data in order to increase the efficiency of processing such volumetric forms. In this case, each block of data will represent a region of the volumetric form such as a cube, etc. (rather than a region of a two-dimensional image). Individual volumetric forms can be grouped together to form larger volumes or hierarchies of volumetric forms, such as a hypercube, etc.

Such volumetric forms or hierarchical volumetric forms can often comprise relatively sparse regions of data. Thus, according to an embodiment, by exploiting the meta-data created when encoding regions of the volumetric form, regions of the volumetric form for which processing is not required can be quickly eliminated. Furthermore, by applying the same technique hierarchically, whole regions of a hierarchical volumetric form can be quickly eliminated.

These techniques are also applicable to computer vision systems where a volumetric reconstruction of one or more images results in volumetric or hierarchically volumetric data. Such systems may comprise one or more depth scanning and/or visible or nonvisible light image sensors. The collected depth or image data is combined to produce a volumetric representation of the images. The techniques of the technology described herein can be applied where the volumetric data is used as an input to another processing stage, e.g. to reduce the resources required for processing relatively sparse regions of the volumetric data.

The technology described herein can also be applied for adaptive G-buffer creation by dynamic variable rate fragment evaluation. According to one such embodiment, the meta-data of the technology described herein may be used to drive dynamic variable rate fragment evaluation, e.g. for the purposes of avoiding over processing.

Variable rate fragment evaluation is a technique which eschews the normal practice of evaluating fragments at a fixed rate based on a 1:1 relationship with the underlying render target, or a 1:N relationship which is controlled by the sub pixel sample definition of the target buffer which is set by using anti-aliasing rate controls in popular graphics APIs, and instead hands control of the evaluation to the application or shader (depending on implementation). Typically, three discrete levels are defined, i.e. "Coarse Shader", "Fragment" and "Sub Fragment" evaluation, respectively representing fixed regions of N×N fragments, a single fragment and then N×N sub-samples. These are typically defined at runtime before issuing each draw call.

The G-buffer content is typically constructed from arrays of data (textures) e.g. that describe different aspects of surface detail or material composition of objects in the scene. These arrays, which are used to represent the basic object information in the G-buffer, are then sampled by shader programs. Each object may have multiple arrays associated with it and may be sampled at variable frequencies (rates or sample counts), which may be dependent on runtime conditions (e.g. how big the object is in the scene, effects applied, etc.).

According to an embodiment, the meta-data in such arrays, e.g. when encoded in the ASTC format, can be exploited to drive the rate of "coarse", "fragment" and "sub fragment" evaluation dynamically. The three static rate evaluations can be collapsed into a single shader comprising a rate control section and the appropriate coarse, fragment and sub-sample sections. By evaluating the meta-data of the sample region which is to be covered by a coarse patch, the rate control shader can then determine how many iterations of the other fragment and sub-sample code sections should be evaluated based on the frequency bands of the meta-data.

For example, if a region samples a source array which contains surface normals only containing low frequency information (i.e. the variance in the normal data is very low) certain types of processing can be bypassed and only triggered if high frequency data is present. This allows for computational resources to be spent on generation of additional entropy within the G-buffer target instead of on redundant calculations which would largely resolve to the same or invariant value over a coarse sample region.

It would also be possible to extend this arrangement to include multiple subsections which are evaluated at differing rates depending on the frequency information in the source array sample regions.

Where plural sources of data from plural underlying arrays of data having associated meta-data are sampled when generating an output array, the sample rate and therefore the rate of evaluation can be set separately for each source. Where multiple arrays of data (textures) are sampled when generating an output array, each sampled array of data may be sampled using its own determined rate or sample count, or a single rate or sample count may be used for plural or all of the sampled textures. The single rate or sample count may be, for example, the average (median, mode, mean, etc.) of the rates or sample counts determined for each of the plural sampled arrays, or the highest determined rate or sample count.

Furthermore, the sample rate or count (e.g. coarse, fragment or sub-fragment sampling) can be selected for each processing step in the shader according to its inputs from the underlying arrays. Where two different processing steps access the same array of data for different purposes, they may use different sampling rates or sample counts, e.g. where the processing steps have different sensitivities to frequency meta-data.

The technology described herein can also be applied to dynamically adaptive anti-aliasing.

According to one such embodiment, the same mechanism can be exploited to avoid shader based aliasing problem. Shader aliasing, that is, visual disturbances primarily caused by high quantisation of contrasting neighbouring pixels as they switch between quantised states from frame to frame, typically occurs when the underlying sampled texture array is under-sampled or is on a boundary condition between two samples. Shader aliasing may occur in situations (such as when rendering specular highlights) where small changes in the sampled region can give large changes in the output result.

According to an embodiment, the meta-data can be used in the rate control shader such that if high levels of high frequency information are present more sub-sample iterations are injected. The result can be combined to smooth the transitions from frame to frame. This can alleviate problems associated with multiple points of origin for aliasing within a fragment shader program which cannot otherwise easily be resolved by a general Anti-Aliasing system (MSAA), without attracting the prohibitive costs of systems such as Super Sampling or Temporal Anti-Aliasing which are undesirable for mobile devices.

This embodiment also allows for dynamic adaption of the number of sub-samples used. For example, some situations may only require a 2×2 grid or sub-samples, some may require up to a 16×16 grid of sub-samples and some no sub-samples at all. This allows for a high level of image quality to be efficiently maintained with minimal overhead.

The techniques of the technology described herein can also be applied to stereoscopic anti-aliasing.

In stereoscopic rendering, two images are rendered, one for the left eye and one for the right eye. The rendering for the left eye image and right eye image differs according to a transform related to the point of view. The transform describes the image as seen by each eye in relation to its position within the skull. The differences between the two images seen by each eye are processed by the brain to create a depth perception. Such stereoscopic rendering, i.e. the production of two separate images intended to be viewed as a stereoscopic pair, when used together with the techniques of the technology described herein can give rise to further aliasing issues since the transform can introduce the possibility that different adaptive aliasing decisions will be made for the left and right images.

Thus, according to an embodiment, the rendering of each stereoscopic rendering target fragment is evaluated as a stereo pair. That is, corresponding fragments of the left and right images are evaluated together. The variable rate fragment evaluation technique using meta-data is used to eliminate aliasing artefacts as described above. However, in this case, any differences in meta-data across the stereo pair, which would otherwise result in different dynamic sub-pixel evaluations (thus causing an aliasing artefact), are compensated for by aligning the sampling rate or sample count determination between the stereo pair. That is, the same sampling rate or sample count is used in respect of each fragment of each stereo pair. In these embodiments, the maximum determined sampling rate or sample count can be used, or an average (e.g. mean, median, mode, etc.) can be used.

The technology described herein can also be applied to adaptive processing of image data for virtual reality displays.

When rendering images for display on a virtual reality display device that comprises a convex lens (for increasing the field of vision and the user's sense of immersion), the image is typically rendered as normal e.g. for display on a standard two-dimensional image display device, and then an additional step is applied to the rendered image to account for the lens. Typically, a transform is applied to the image before it is output in order to effectively project it onto a hemisphere which describes the curvature of the lens in the virtual reality display device. This projection creates a non-linear relationship between the pixels rendered in the original image and the final display device image. This can cause the image to look "stretched", and can cause associated banding issues (due to the projection exceeding the capabilities of standard texture filtering techniques such as bilinear interpolation, etc.) e.g. at the periphery of the image when viewed through the lens. This can also cause visual aberrations or aliasing effects in the portion of the user's vision which is attuned to sensing motion. The combined effects of these aberrations can increase the chances of a user experiencing motion sickness, even when the displayed image is moving relatively slowly.

These problems can be addressed e.g. by increasing the resolution of the original image. However the associated costs in terms of computation and power consumption of this technique are relatively high.

According to an embodiment of the technology described herein, the projection is taken into account together with the meta-data in the variable rate fragment evaluation technique. For example, the fragment, sub-fragment and coarse fragment evaluation rate can be adaptively increased to eliminate aliasing effects. A relatively high rate or sample count may be used for regions of the image that are to be stretched (and vice versa), e.g. such that the final image as presented to the user through the lens has a constant or near-to-constant pixel size throughout the image. This will have the effect of reducing or avoiding visible aliasing in the image, without necessarily increasing the sampling rate or sample count throughout the image, and can thereby reduce or avoid the above described problems in a more efficient manner.

It would be possible for the transform to be applied to the image after the image has been rendered and written to a buffer (e.g. frame buffer), and for the transformed image to then be passed to the display for display. Alternatively, the transform may be integrated together with the rendering step or G-buffer resolve pass, e.g. such that the unmodified image need not then be written to a buffer before the unmodified image is modified and the modified image is sent for display. As will be appreciated by those having skill in the art, this can then further reduce the power and bandwidth requirements of the system.

Figure 7:
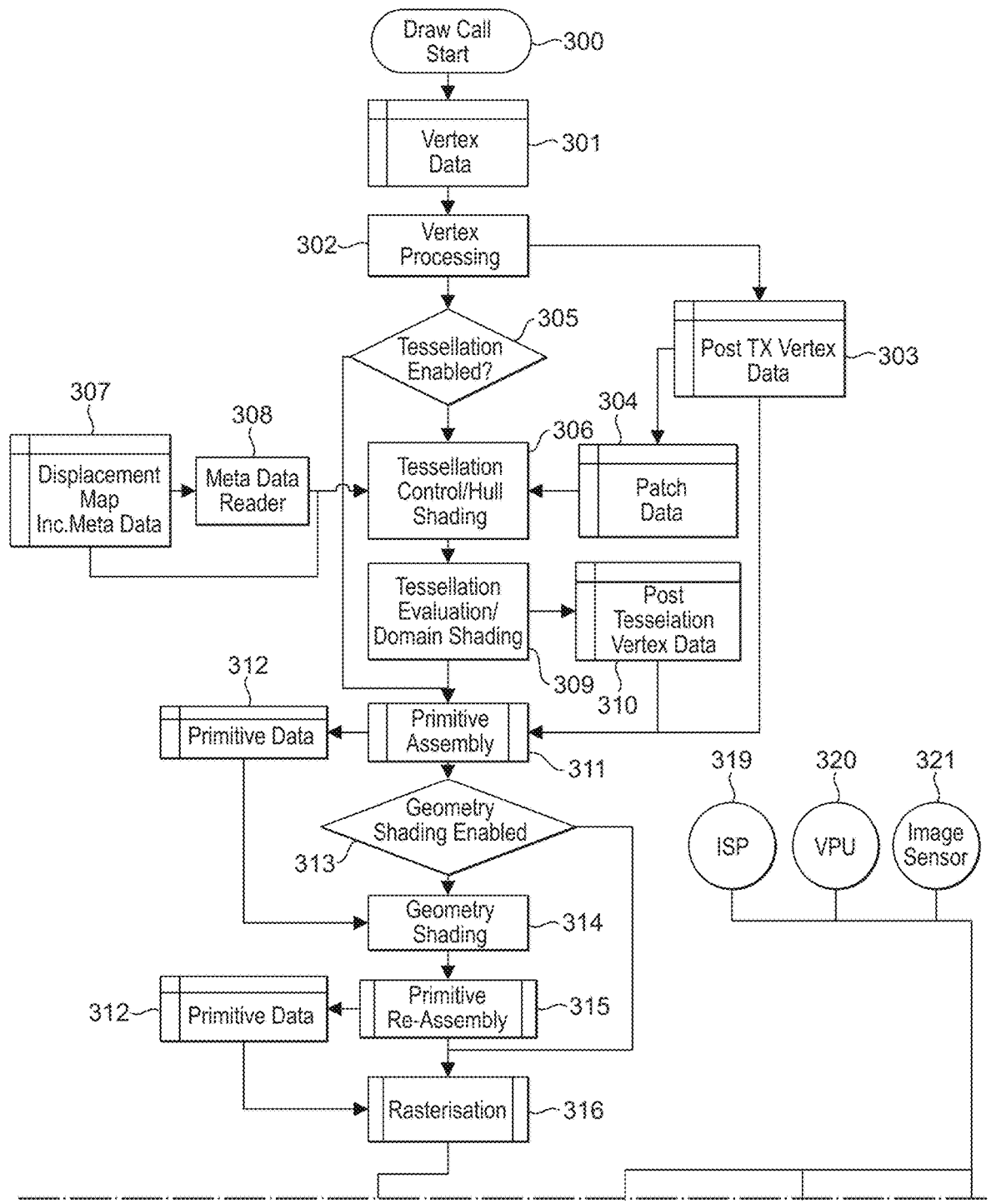
FIG. 7 shows a flow chart illustrating the operation of a graphics processing pipeline in accordance with embodiments of the technology described herein.
Figure 7:
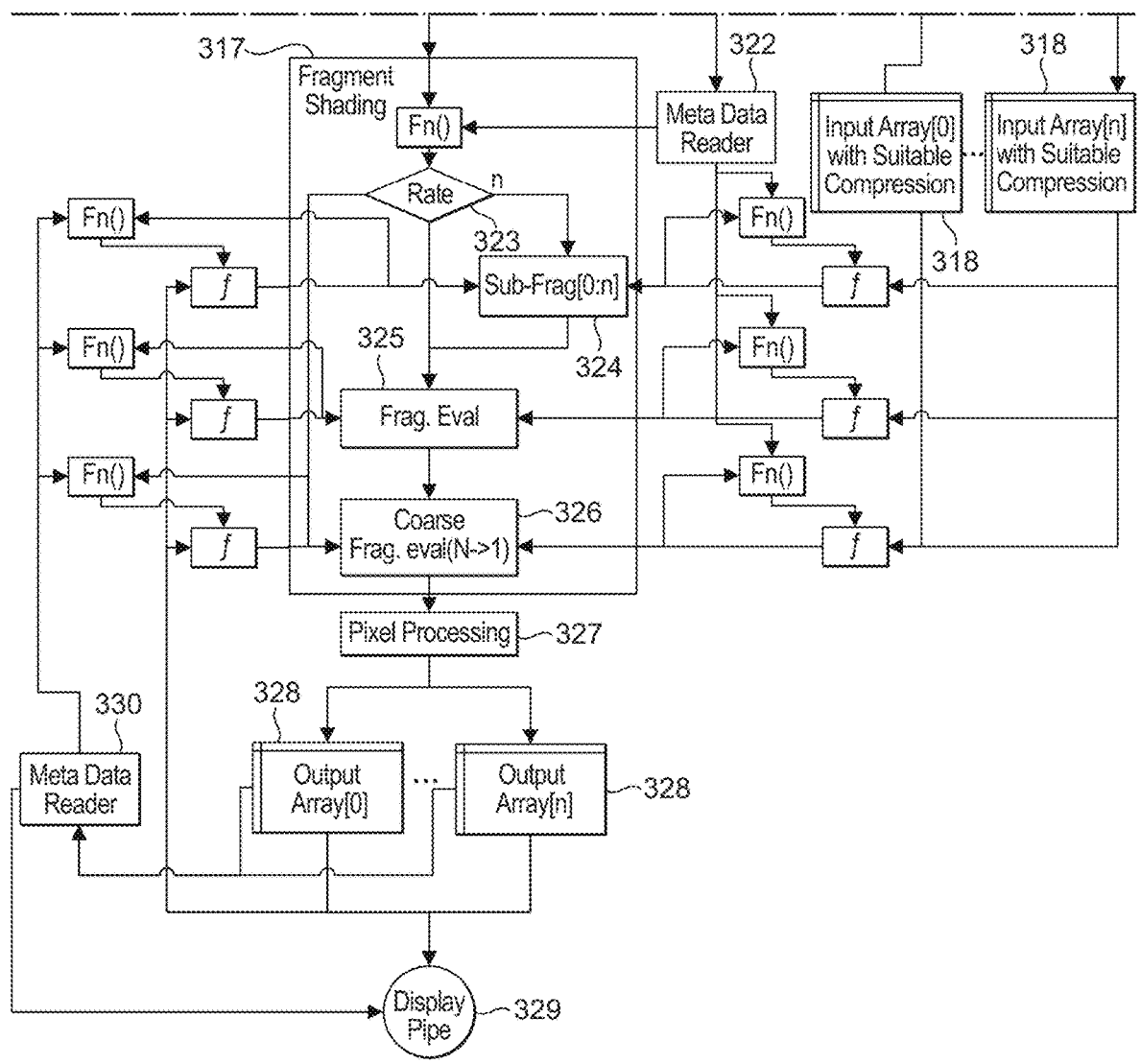

FIG. 7 shows a flow chart illustrating the operation of a graphics processing pipeline in accordance with various embodiments, in which the variable rate fragment evaluation technique using meta-data is implemented.

FIG. 7 shows the sequence of operations for a given draw call for a graphics processing output (e.g. frame to be displayed), and so accordingly starts at the point where the next draw call's processing is started (step 300).

For each draw call, a respective set of vertex data 301 which defines vertices to be used for the draw call is defined. In the present embodiment each object to be processed is represented by one or more "patches" which each represent a region of the object in question, with the respective patches each being defined and having associated with them a respective set of vertices of the draw call that, e.g., define the corners of the respective patches. The patches are typically in the form of simple polygons such as triangles or quadrilaterals.

The vertex data 301 for the draw call is processed by a vertex shader to transform the virtual three-dimensional positions of the vertices to their two-dimensional positions in screen space (step 302). Once the vertices have been processed, this processed vertex data 303 is grouped into the patches (step 304) which represent the regions of the objects to be displayed.

Once the vertex processing has been completed, it is then determined whether tessellation has been enabled for the draw call (step 305). If tessellation has not been enabled, the processing proceeds directly to the primitive assembly stage (step 311).

If tessellation has been enabled, the next stage in the processing is to carry out tessellation control/hull shading (step 306) in a hull shader. The inputs to this tessellation control/hull shading stage are the patch data 304 indicating the patches of the objects to be processed for the draw call, optionally together with displacement map meta-data 307 via a meta-data reader 308. The hull shader can use the meta-data 307 to determine whether and to what extent to tessellate additional vertices and primitives within each patch, i.e. whether to create additional polygon vertices within the patch (step 306).

Once any additional polygon vertices have been generated, they are passed to an evaluation shader. The evaluation shader can optionally displace the positions of the both the original and additional polygon vertices (step 309) to generate post tessellation vertex data 310.

The post-tessellation vertex data 310, i.e. optionally with the additional polygon vertices displaced to their new positions, is then passed to the next stage of the graphics processing pipeline in order to render the object for output.

Next, the primitives which will make up and be processed for the region of object in question are assembled (step 311), using the post tessellation vertex data 310 and the post vertex shading vertex data 303. The "assembled" primitive data 312 is then stored.

If geometry shading is enabled (step 313), a geometry shader takes the primitive data 312 and creates new geometry (primitives) if necessary (step 314).

If additional primitives are created by the geometry shader they are re-assembled (step 315), with all the resultant primitives, e.g. no additional primitives if the geometry shader has not been used, being passed to a rasteriser for rasterisation (316).

The rasterising process determines the sample positions that should be used for a primitive (i.e. the (x, y) positions of the sample points to be used to represent the primitive in the output, e.g. frame to be displayed).

The rasterisation stage of the graphics processing pipeline operates to rasterise the primitives making up the render output (e.g. the frame to be displayed) into individual graphics fragments for processing. To do this, the rasteriser receives graphics primitives for rendering, rasterises the primitives to sampling points and generates graphics fragments having appropriate positions (representing appropriate sampling positions) for rendering the primitives.

The fragments generated by the rasteriser are then sent onwards to a fragment shader for rendering (shading) (step 317). The fragment shader operates to determine an appropriate data value (e.g. colour) for each fragment, i.e. so as to generate one or more output arrays of data 328 (e.g. frames for display, etc.).

In the fragment shader, one or more compressed arrays of data 318 may be sampled and used in determining the appropriate data values (e.g. colours) for each fragment. The one or more compressed arrays of data 318 may comprise, for example, image data, texture data, G-buffer data, etc. (as described above). As shown in FIG. 7, the one or more compressed arrays of data 318 may be generated, for example, by an Image Signal Processor 319, a Video Processing Unit (VPU) 320, or an image sensor 321, but other arrangements would also be possible (as described above).

In the present embodiment, meta-data indicative of the variation in the data is extracted from each sampled compressed array of data 318 (as described above) by a meta-data reader 322. The meta-data is then used to determine a sampling rate at which or sample count with which the compressed array of data 318 should be sampled when determining the appropriate data values (e.g. colours) for each fragment (step 323).

In the present embodiment, a sub-fragment sampling rate 324 (i.e. a supersampling or multisampling rate where the array of data is sampled multiple times for each fragment), a fragment (1:1) sampling rate 325 (i.e. where for each fragment, a single corresponding data element or region is sampled from the array of data), and/or a coarse fragment sampling rate 326 (i.e. where a single sample of the array of data is sampled in respect of multiple fragments) can be selected depending on the meta-data. For example, where the meta-data indicates that the variation in the data to be sampled is relatively small (e.g. the data to be sampled comprises relatively low frequency components or only "DC" data), then coarse sampling 326 may be used to sample the data. Where the meta-data indicates that the variation in the data to be sampled is relatively large (e.g. the data to be sampled comprises relatively high frequency components), then sub-fragment sampling 324 (supersampling or multisampling) may be used to sample the data.

Where the meta-data indicates that the variation in the data to be sampled has some intermediate value, then fragment (1:1) sampling 325 may be used to sample the data.

As described above, this arrangement, that uses meta-data indicative of the variation in the sampled arrays of data, represents a particularly convenient and efficient mechanism for driving a variable rate fragment evaluation technique.

The rendered fragments from the fragment shading stage can then optionally be processed by a pixel processor to, e.g., downsample the rendered fragments to provide rendered pixel data for the pixels that will actually be output (e.g. displayed) (step 327). The pixel data may then, e.g., be output to main memory (e.g. a frame buffer) for display as one or more output arrays of data 328, before being sent for display via display pipe (step 329).

As shown in FIG. 7, where the output arrays of data are themselves compressed, meta-data from the output arrays of data 328 may optionally be read by meta-data reader 330 and fed-back to the fragment shader 317.

For example, where the "final" output array(s) of data is generated using multiple rendering passes (such as in deferred shading as described above), one or more "intermediate" output arrays of data 328 (e.g. a G-Buffer) may be generated by a first rendering pass, and then used as a data source(s) in a subsequent rendering pass. In this case, meta-data in from the one or more "intermediate" output arrays of data 328 may be used to affect the processing of the one or more "intermediate" output arrays of data 328 (as described above).

In tile based systems, it would also possible to read back the contents of one or more of the output arrays of data 328 (e.g. completed tiles) as the output array of data 328 is being generated. In these cases, the meta-data could be generated in real-time, or the generation of the meta-data could be done between output array update phases.

As also shown in FIG. 7, meta-data from the output arrays of data 328 read by meta-data reader 330 could also or alternatively be used to affect the display pipe 329. This would be the case, for example, where anti-aliasing is integrated into the display hardware e.g. in the virtual reality display and stereoscopic anti-aliasing embodiments described above. This could also or alternatively be used when applying a fixed function filter or similar processing in the display pipe.

It can be seen from the above that in at least an embodiment, meta-data extracted from the compressed blocks of data can be used to aid the processing of the blocks of data, e.g. to prepare them for display. By using meta-data during subsequent processing of the blocks of data, the amount of image processing required and thus power consumed is reduced, or alternatively a more complex level of processing can be performed for the same amount of power. Furthermore the technology described herein reduces the amount of data needed to be transferred because the meta-data can be used to infer information about the original blocks of data, i.e. before they were compressed, therefore obviating the need to use the original blocks of data and thus being able to use the compressed blocks of data.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a data processing system, the method comprising the data processing system:

forming an output array of image or graphics data;

compressing blocks of the image or graphics data using a compressor to produce compressed blocks of image or graphics data, wherein each block of the image or graphics data represents a sub-region of the output array of the image or graphics data, wherein the compressor is configured to create meta-data as part of the compressing of each block of the image or graphics data, and wherein the compressor is configured such that the meta-data for each block of the image or graphics data comprises information representative of the variation in the image or graphics data values in that block of the image or graphics data;

storing the image or graphics data in an output buffer of the data processing system by writing the compressed blocks of image or graphics data to the output buffer;

reading at least one of the compressed blocks of the image or graphics data from the output buffer;

acquiring the meta-data from the at least one read compressed block of the image or graphics data, wherein the acquired meta-data forms part of the at least one read compressed block of image or graphics data; and determining, using the acquired meta-data, whether the image or graphics data of the at least one read compressed block of image or graphics data should be processed;

wherein when it is determined, using the acquired meta-data, that the image or graphics data of the at least one read compressed block of image or graphics data should be processed, then the method further comprises the data processing system choosing, using the acquired meta-data, between one of a plurality of image modification processes to use to perform image modifications on the image or graphics data of the at least one read compressed block of image or graphics data, and processing the image or graphics data of the at least one read compressed block of image or graphics data by performing image modifications on the image or graphics data of the at least one read compressed block of image or graphics data.

2. A method as claimed in claim 1, wherein the acquired meta-data is used to affect the image modifications on the image or graphics data of the at least one read compressed block of image or graphics data.

3. A method as claimed in claim 1, further comprising determining, using the acquired meta-data, whether one or more other blocks of the image or graphics data should be processed.

4. A method as claimed in claim 1, further comprising processing one or more other blocks of the image or graphics data by performing image modifications on the image or graphics data of the one or more other blocks of the image or graphics data, wherein the acquired meta-data is used to affect the image modifications on the image or graphics data of the one or more other blocks of data.

5. A method as claimed in claim 1, further comprising decompressing the at least one read compressed block of image or graphics data to form a decompressed block of image or graphics data, and processing the decompressed block of image or graphics data by performing image modifications on the image or graphics data of the decompressed block of image or graphics data, wherein the acquired meta-data is used to affect the image modifications on the image or graphics data of the decompressed block of image or graphics data.

6. A method as claimed in claim 1, wherein processing the at least one read compressed block of image or graphics data comprises using the image or graphics data of the at least one read compressed block of image or graphics data to generate a second output array of image or graphics data.

7. A method of operating a data processing system, the method comprising the data processing system:

forming a first output array of image or graphics data;

compressing blocks of the image or graphics data using a compressor to produce compressed blocks of the image or graphics data, wherein each block of the image or graphics data represents a sub-region of the first output array of the image or graphics data, wherein the compressor is configured to create meta-data as part of the compressing of each block of the image or graphics data, and wherein the compressor is configured such that the meta-data for each block of the image or graphics data comprises information representative of the variation in the image or graphics data values in that block of the image or graphics data;

storing the image or graphics data in an output buffer of the data processing system by writing the compressed blocks of the image or graphics data to the output buffer;

reading at least one of the compressed blocks of the image or graphics data from the output buffer;

acquiring the meta-data from the at least one read compressed block of the image or graphics data, wherein the acquired meta-data forms part of the at least one read compressed block of the image or graphics data; and using the image or graphics data of the at least one read compressed block of image or graphics data to generate a second output array of image or graphics data;

wherein the acquired meta-data is used by the data processing system to choose between one of a plurality of image modification processes to use to perform image modifications on the image or graphics data of the at least one read compressed block of image or graphics data, and to determine the rate or sample count at which the image or graphics data of the at least one read compressed block of image or graphics data is sampled when generating the second output array of image or graphics data.

8. A data processing system comprising:

processing circuitry arranged to generate image or graphics data to form an output array of image or graphics data;

compressor processing circuitry arranged to compress blocks of the image or graphics data to produce compressed blocks of image or graphics data, wherein each block of the image or graphics data represents a sub-region of the output array of the image or graphics data, wherein the compressor processing circuitry is configured to create meta-data as part of the compressing of each block of the image or graphics data, and wherein the compressor processing circuitry is configured such that the meta-data for each block of the image or graphics data comprises information representative of the variation in the image or graphics data values in that block of the image or graphics data;

processing circuitry arranged to store the generated image or graphics data in an output buffer by writing the compressed blocks of image or graphics data to the output buffer;

processing circuitry arranged to read at least one of the compressed blocks of image or graphics data from the output buffer;

processing circuitry arranged to acquire the meta-data from the at least one read compressed block of image or graphics data, wherein the acquired meta-data forms part of the at least one read compressed block of image or graphics data;

processing circuitry arranged to determine, using the acquired meta-data, whether the image or graphics data of the at least read compressed block of image or graphics data should processed;

processing circuitry arranged to choose, using the acquired meta-data, between one of a plurality of image modification processes to use to perform image modifications on the image or graphics data of the at least one read compressed block of image or graphics data; and processing circuitry arranged to, when it is determined that the image or graphics data of the at least one read compressed block of image or graphics data should be processed, process the image or graphics data of the at least one read compressed block of image or graphics data by performing image modifications on the image or graphics data of the at least one read compressed block of image or graphics data.

9. A data processing system as claimed in claim 8, wherein the acquired meta-data is used to affect the image modifications on the image or graphics data of the at least one read compressed block of image or graphics data.

10. A data processing system as claimed in claim 8, comprising processing circuitry arranged to determine, using the acquired meta-data, whether one or more other blocks of the image or graphics data should be processed.

11. A data processing system as claimed in claim 8, comprising processing circuitry arranged to process one or more other blocks of the image or graphics data by performing image modifications on the image or graphics data of the one or more other blocks of image or graphics data, wherein the acquired meta-data is used to affect the image modifications on the image or graphics data of the one or more other blocks of image or graphics data.

12. A data processing system as claimed in claim 8, wherein the processing circuitry arranged to process the image or graphics data of the at least one read compressed block of image or graphics data is arranged to use the image or graphics data of the at least one read compressed block of image or graphics data to generate a second output array of image or graphics data.

13. A data processing system as claimed in claim 8, wherein the acquired meta data is used to determine a type or degree of the image modifications that are performed on the image or graphics data of the at least one read compressed block of image or graphics data.

14. A data processing system as claimed in claim 8, wherein the image modifications comprise scaling the image or graphics data of the at least one read compressed block of image or graphics data and/or performing image enhancement on the image or graphics data of the at least one read compressed block of image or graphics data, wherein the acquired meta data is used to affect the scaling of the image or graphics data of the at least one read compressed block of image or graphics data and/or the image enhancement on the image or graphics data of the at least one read compressed block of image or graphics data.

15. A data processing system as claimed in claim 8, comprising processing circuitry arranged to display the processed image or graphics data of the at least one read compressed block of image or graphics data.

16. A data processing system as claimed in claim 8, wherein the output buffer comprises a frame buffer and the output array of data comprises a frame to be displayed.

17. A data processing system as claimed in claim 8, comprising processing circuitry arranged to use the acquired meta-data to determine the rate or sample count at which the image or graphics data of the at least one read compressed block of data is sampled when performing image modifications on the image or graphics data of the at least one read compressed block of image or graphics data.

18. A data processing system comprising:
processing circuitry arranged to generate image or graphics data to form a first output array of image or graphics data;
compressor processing circuitry arranged to compress blocks of the image or graphics data to produce compressed blocks of image or graphics data, wherein each block of the image or graphics data represents a sub-region of the first output array of the image or graphics data, wherein the compressor processing circuitry is configured to create meta-data as part of the compressing of each block of the image or graphics data, and wherein the compressor processing circuitry is configured such that the meta-data for each block of the image or graphics data comprises information representative of the variation in image or graphics data values in that block of the image or graphics data;
processing circuitry arranged to store the generated image or graphics data in an output buffer by writing the compressed blocks of image or graphics data to the output buffer;
processing circuitry arranged to read at least one of the compressed blocks of image or graphics data from the output buffer;
processing circuitry arranged to acquire the meta-data from the at least one read compressed block of image or graphics data, wherein the acquired meta-data forms part of the at least one read compressed block of image or graphics data;
processing circuitry arranged to use the image or graphics data of the at least one read compressed block of image or graphics data to generate a second output array of image or graphics data; and
processing circuitry arranged to choose, using the acquired meta-data, between one of a plurality of image modification processes to use to perform image modifications on the image or graphics data of the at least one read compressed block of image or graphics data;
wherein the acquired meta-data is used to determine the rate or sample count at which the image or graphics data in the at least one read compressed block of image or graphics data is sampled when generating the second output array of image or graphics data.

* * * * *